US010882549B2

(12) United States Patent
Hiramoto et al.

(10) Patent No.: US 10,882,549 B2
(45) Date of Patent: Jan. 5, 2021

(54) GEAR HOUSING FOR ELECTRIC POWER STEERING DEVICE

(71) Applicant: NSK LTD., Kanagawa (JP)

(72) Inventors: Takayuki Hiramoto, Kanagawa (JP); Taketoshi Chifu, Kanagawa (JP)

(73) Assignee: NSK, Ltd., Tokyo (JP)

(*) Notice: Subject to any disclaimer, the term of this patent is extended or adjusted under 35 U.S.C. 154(b) by 0 days.

(21) Appl. No.: 16/636,740

(22) PCT Filed: Jan. 10, 2019

(86) PCT No.: PCT/JP2019/000436
§ 371 (c)(1),
(2) Date: Feb. 5, 2020

(87) PCT Pub. No.: WO2019/139060
PCT Pub. Date: Jul. 18, 2019

(65) Prior Publication Data
US 2020/0331516 A1  Oct. 22, 2020

(30) Foreign Application Priority Data
Jan. 15, 2018 (JP) .................. 2018-003955

(51) Int. Cl.
B62D 5/04 (2006.01)

(52) U.S. Cl.
CPC .......... B62D 5/0403 (2013.01); B62D 5/0454 (2013.01)

(58) Field of Classification Search
CPC ..................... B62D 5/0403; B62D 5/0406
See application file for complete search history.

(56) References Cited

U.S. PATENT DOCUMENTS

| 9,233,709 | B2 * | 1/2016 | Ishii ................. B62D 5/0409 |
| 10,000,227 | B2 * | 6/2018 | Kurokawa ............. G01L 3/105 |
| 2002/0047379 | A1 | 4/2002 | Torii et al. |
| 2010/0101889 | A1 | 4/2010 | Yamaguchi et al. |

(Continued)

FOREIGN PATENT DOCUMENTS

| JP | 2001346352 | 12/2001 |
| JP | 2009018766 | 1/2009 |
| JP | 2010100217 | 5/2010 |

(Continued)

OTHER PUBLICATIONS

International Search Report for International Application No. PCT/JP2019/000436, dated Mar. 12, 2019, (1 page).

Primary Examiner — Kevin Hurley
(74) Attorney, Agent, or Firm — Hartman Global IP Law; Gary M. Hartman; Domenica N. S. Hartman

(57) ABSTRACT

To provide a gear housing comprising a front housing having a structure which can make the front housing lightweight and which can increase the strength of a continuous section of a worm wheel housing portion and a support portion where stress tends to be concentrated. A front-side housing is made of synthetic resin, and includes a housing front plate portion which constitutes a worm wheel housing portion and a support portion integrated with the housing front plate portion. A reinforcing member made of a metal plate is provided at a corner portion between a front surface of the housing front plate portion and a lower surface of the support portion.

12 Claims, 34 Drawing Sheets

(56) References Cited

U.S. PATENT DOCUMENTS

2015/0298724 A1   10/2015   Ishii et al.
2017/0366064 A1*  12/2017   Kawaguchi .............. H02K 5/02

FOREIGN PATENT DOCUMENTS

| JP | 2013144497 | 7/2013 |
| JP | 2014069422 | 5/2014 |
| JP | 2015094375 | 5/2015 |
| WO | 2016084659 | 6/2016 |

* cited by examiner (A)

(B)

(A)

(B)

(A)

(B)

(A)

(B)

(A)

(B)

GEAR HOUSING FOR ELECTRIC POWER STEERING DEVICE

CROSS REFERENCE TO RELATED APPLICATIONS

This application claims the benefit of PCT/JP2019/000436 filed Jan. 10, 2019, having a priority claim to Japanese Patent Application No. 2018-003955 filed Jan. 15, 2018. The contents of these prior patent documents are incorporated herein by reference.

TECHNICAL FIELD

The present invention relates to a gear housing for an electric power steering device for accommodating a worm speed reducer.

BACKGROUND ART

FIG. 39 illustrates an example of a conventional structure of an electric power steering device. A steering wheel 1 that is operated by a driver to change the traveling direction of a vehicle is fixed to a rear-end portion of a steering shaft 2. The steering shaft 2 is rotatably supported inside a cylindrical steering column 3. During steering, the movement of the steering wheel 1 is transmitted to a pinion shaft 8 of a steering gear unit 7 via the steering shaft 2, an electric assist device 4, a universal joint 5a, an intermediate shaft 6, and another universal joint 5b. As the pinion shaft 8 rotates, a pair of tie rods 9 arranged on both sides of the steering gear unit 7 is pushed and pulled, and a steering angle corresponding to the operation amount of the steering wheel 1 is applied to a pair of left and right steered wheels. The force required for the driver to operate the steering wheel 1 is reduced by auxiliary power applied from the electric assist device 4. Note that the front-rear direction refers to the front-rear direction of the vehicle body in which the electric power steering device is assembled.

FIG. 40 illustrates a specific structure of the electric assist device described in WO 2016/084659. The electric assist device 4a is provided in front of the steering column 3 and measures the steering torque that is inputted to the steering shaft 2 from the steering wheel 1 (refer to FIG. 39) by a torque sensor 10, and based on this measurement signal, energization of the electric motor 11 is controlled. The auxiliary power generated by the electric motor 11 is applied to an output shaft 13 via a worm speed reducer 12. The torque sensor 10 and the worm speed reducer 12 are accommodated in a gear housing 14 that is fixed to a front-end portion of the steering column 3.

The gear housing 14 is constructed by connecting a front-side housing 15 and a rear-side housing 16 in the front-rear direction with a plurality of bolts. The front-side housing 15 includes a front-half portion of a worm wheel housing portion 17 and a cylindrical worm-housing portion 18. The worm wheel housing portion 17 is provided with a support portion 19 for supporting the gear housing 14 so as to be able to oscillate with respect to the vehicle body, the support portion 19 protruding forward.

A worm wheel 20 that is externally fitted and fixed to the output shaft 13 is accommodated inside the worm wheel housing portion 17. A worm shaft 21 that is connected to the output shaft of the electric motor 11 is accommodated inside the worm-housing portion 18. A worm 22 provided at an intermediate portion of the worm shaft 21 is engaged with the worm wheel 20.

The output shaft 13 is rotatably supported on the inner side of the gear housing 14 via a pair of rolling bearings 23a and 23b, and is connected to an input shaft 24 arranged coaxially with the output shaft 13 via a torsion bar 25. The front-end portion of the output shaft 13 is connected to the pinion shaft 8 via a pair of universal joints 5a and 5b and the intermediate shaft 6, as illustrated in FIG. 39. The rear-end portion of the input shaft 24 is connected to the front-end portion of the steering shaft 2. When the steering wheel 1 is operated, the input shaft 24 and the output shaft 13, due to the steering torque applied to the input shaft 24 via the steering shaft 2 and the resistance against rotation of the output shaft 13, displace relative to each other in the direction of rotation while causing the torsion bar 25 to elastically deform in a twisting direction. The relative displacement amount between the input shaft 24 and the output shaft 13 is measured by the torque sensor 10. A controller (not illustrated), using the measurement signal of the torque sensor 10, applies auxiliary power (auxiliary torque) to the output shaft 13 via the electric motor 11 and the worm speed reducer 12.

PRIOR ART DOCUMENTS

Patent Literature

Patent Literature 1: WO 2016/084659 A1
Patent Literature 2: JP 2013-144497 A
Patent Literature 3: JP 2015-094375 A

SUMMARY OF INVENTION

Problem to be Solved by the Invention

In recent years, there has been an increasing demand for lower fuel consumption of automobiles, and further weight reduction of automobile components is being promoted. In view of such circumstances, using a synthetic resin having a density lower than that of metal to make a gear housing in which an electric power steering device is assembled has been considered.

However, when a vehicle is traveling, the road surface reaction force applied to the wheels is transmitted to the output shaft arranged inside the gear housing via the tie rods, steering gear unit, intermediate shaft, and the like, and then loaded onto the gear housing via the rolling bearings. Moreover, in order to reduce the force required to operate the steering wheel, the meshing reaction force that acts on the worm wheel when the worm shaft is driven and rotated in the forward direction or the reverse direction is also loaded onto the gear housing via the output shaft and the rolling bearings. On the other hand, the gear housing is cantilevered with respect to the vehicle body by the support portion. Therefore, due to external forces such as the road surface reaction force and the meshing reaction force, a force that causes the support portion to bend, a force that twists the support portion, or the like acts on the gear housing. Accordingly, stress is likely to concentrate on a continuous portion (in the vicinity of the base of the support portion) between the worm wheel housing portion and the support portion. As a result, it is desirable to improve the strength of the continuous portion, particularly in a case where a synthetic resin gear housing having a lower strength than metal is used. Note that as other prior art documents related to the present invention, there are JP2013-144497A and JP2015-94375A. These publications describe techniques for incorporating metal parts into a part of a synthetic resin gear housing. However, none of the publications describes improving the strength of the continuous portion between the worm wheel housing portion and the support portion.

The present invention has been made in view of the circumstances as described above, and an object of the present invention is to achieve a gear housing structure for an electric power steering device that is capable of reducing the weight and improving the strength of the continuous portion of the worm wheel housing portion and the support portion.

Means for Solving the Problems

The gear housing for an electric power steering device of the present invention constitutes an electric power steering device and comprises a worm wheel housing portion, a worm housing portion, and a support portion.

The worm wheel housing portion is for housing a worm wheel on the inside thereof and has a housing cylinder portion arranged around the worm wheel, an annular shaped housing front plate portion covering a front-end opening of the housing cylinder portion, and an annular shaped housing rear plate portion covering a rear-end opening of the housing cylinder portion.

The worm housing portion is for housing a worm shaft on the inside thereof, and is provided in part in the circumferential direction of an outer-diameter-side portion of the worm wheel housing portion.

The support portion is for providing support with respect to a vehicle body, and is provided to protrude forward from a front surface of the housing front plate portion. The support portion may also support the gear housing for an electric power steering device so as to oscillate with respect to the vehicle body, and may also support it so as not to oscillate. In a case where the gear housing for an electric power steering device is supported to oscillate with respect to the vehicle body, the support portion can be particularly called a pivot portion.

Particularly, in the present invention, at least the housing front plate portion and the support portion are integrally formed using synthetic resin, and a metal reinforcing member is provided in a continuous portion between the housing front plate portion and the support portion.

In the present invention, the reinforcing member may be bent shaped and have a front plate reinforcing portion arranged on the housing front plate portion, and a support portion reinforcing portion arranged on the support portion.

In this case, the reinforcing member may have a shape bent substantially at a right angle.

In addition, the reinforcing member may further have a curved portion that is curved in a circular arc shape and connects an upper end portion of the front plate reinforcing portion and a rear-end portion of the support portion reinforcing portion.

In the present invention, the reinforcing member may be made of a metal plate, and be provided at a corner portion of the continuous portion between a front surface of the housing front plate portion and a lower surface of the support portion. The front plate reinforcing portion may be provided so as to cover the front surface of the housing front plate portion; and the support portion reinforcing portion may be provided so as to cover the lower surface of the support portion.

In this case, the reinforcing member may have: a main body plate portion that is bent along the corner portion and includes the front plate reinforcing portion and the support portion reinforcing portion; and a pair of bent portions bent in the same direction from both sides in the width direction of the main body plate portion.

Alternatively, the reinforcing member may be a metal wire bent along the continuous portion.

In a case where the reinforcing member made of a metal plate is provided at the corner portion, and an intersection of an imaginary line passing through the front surface of the front plate reinforcing portion and an imaginary line passing through the lower surface of the support portion reinforcing portion is a reference point, a length dimension from the reference point to a tip-end portion (front-end portion) of the support part reinforcing portion is $L_{insert}$, and a length dimension from the reference point to a load application point of the support portion corresponding, for example, to the contact portion with the tilt shaft that is the oscillation center is $L_{load}$, $L_{insert}/L_{load}$ may be greater than 0.29.

In the present invention, the reinforcing member may have a substantially L shape, and one of the front plate reinforcing portion and the support portion reinforcing portion may have a length dimension that is greater than a length dimension of the other.

Alternatively, the length dimension of the front plate reinforcing portion and the length dimension of the support portion reinforcing portion may also be made to be the same.

In the present invention, a minute uneven portion may be provided on a surface of the reinforcing member, and the reinforcing member may be joined to the continuous portion by an anchor effect caused by a part of synthetic resin of the continuous portion entering into the minute uneven portion.

Alternatively, the reinforcing member may be bonded and fixed to the continuous portion with an adhesive.

In the present invention, the gear housing for the electric power steering device may be constructed by combining the front-side housing and the rear-side housing in a front-rear direction directly or via another member such as an intermediate plate or the like.

In this case, the front-side housing may be made of synthetic resin and have the housing cylinder portion, the housing front plate portion, the worm housing portion, and the support portion; and the rear-side housing may have the housing rear plate portion.

Alternatively, the front-side housing may be made of synthetic resin and have the housing front plate portion and the support portion; and the rear-side housing may have the housing cylinder portion, the housing rear plate portion and the worm housing portion.

Effect of Invention

With the present invention configured as described above, the weight of the gear housing for an electric power steering device may be reduced, and the strength of the continuous portion between the worm wheel housing portion and the support portion where stress is likely to concentrate may be increased.

BRIEF DESCRIPTION OF DRAWINGS

FIG. 9A is a view of the reinforcing member as seen from below, and FIG. 9B is a view of the reinforcing member as seen from above.

FIG. 11A is a side view, and FIG. 11B is a perspective view.

MODES FOR CARRYING OUT THE INVENTION

First Example

The first example of an embodiment of the present invention will be described with reference to FIG. 1 to FIG. 10. Although there exists parts of which the detail shapes partially differ between drawings, there is no difference in the content and function regarding parts to which the same reference numbers are assigned.

Figure 39:
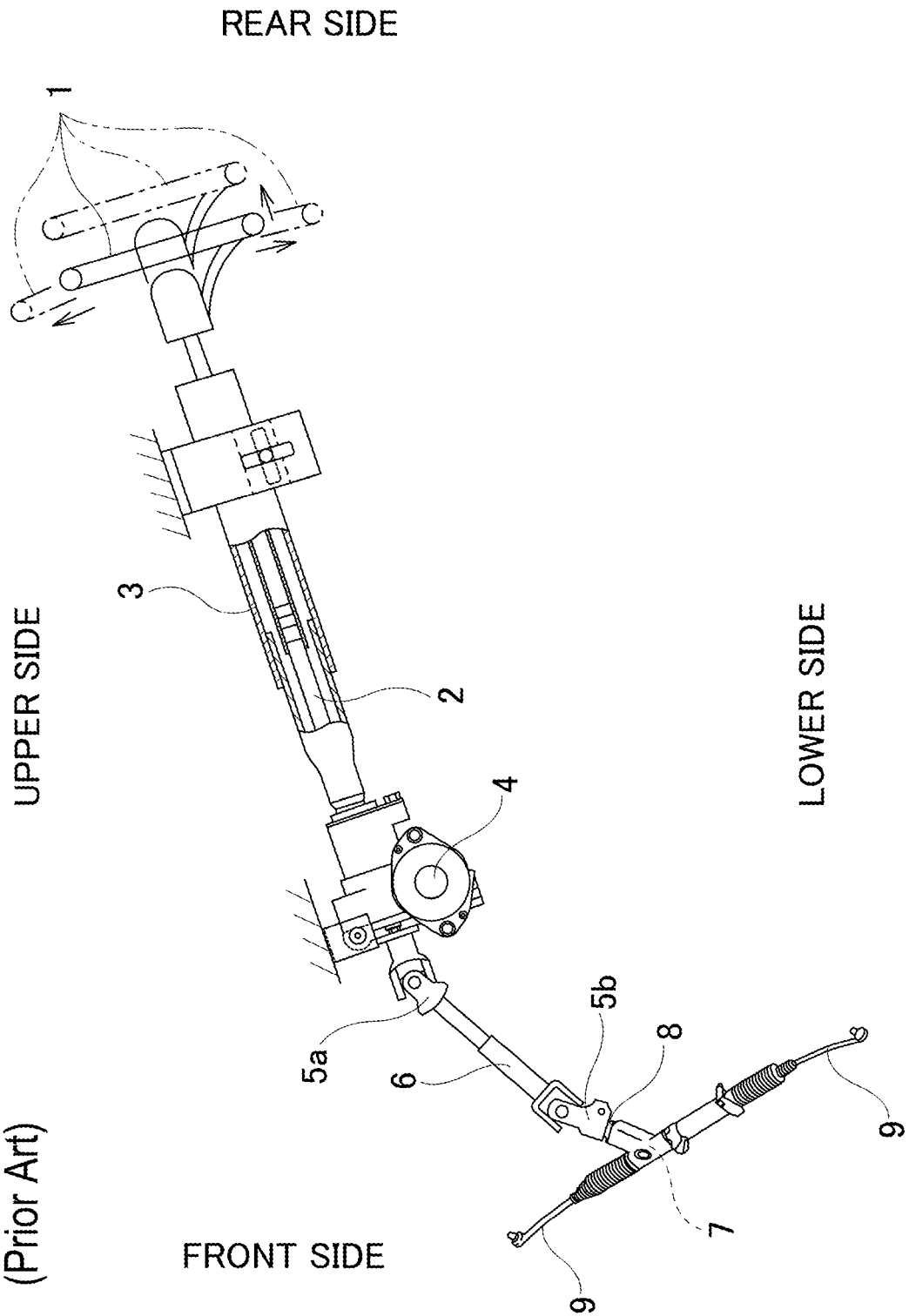
FIG. 39 is a partially cut side view illustrating an example of an electric power steering device having a conventional structure.
Figure 40:
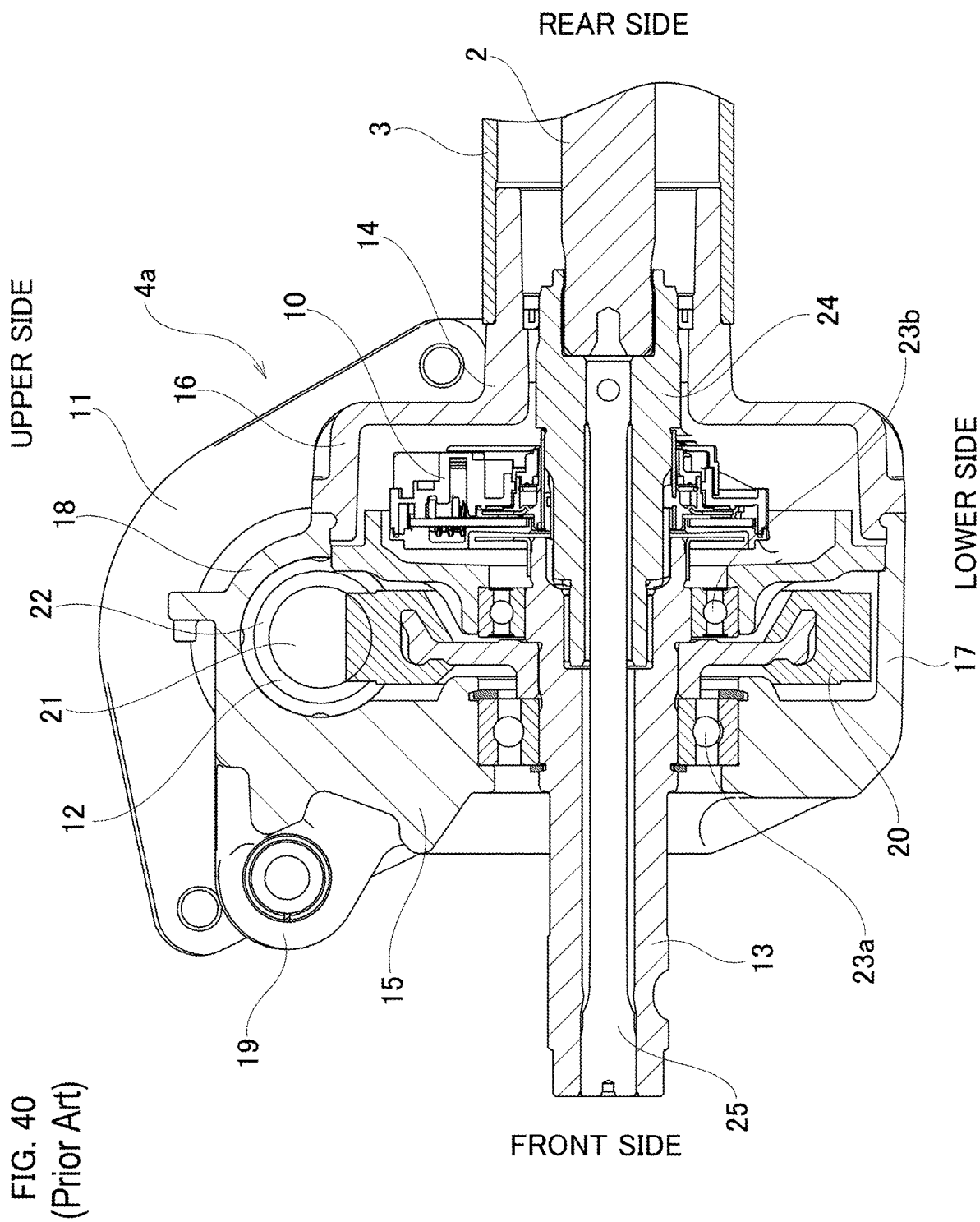
FIG. 40 is a cross-sectional view of the main part of a conventional electric assist device, and corresponds to FIG. 3.

The electric power steering device of this example includes a tilt/telescopic mechanism that allows the vertical position and front-rear position of the steering wheel 1 (refer to FIG. 39) to be adjusted in accordance with the physique and driving posture of the driver, and an electric assist device 4b that can reduce the force required for operating the steering wheel 1.

A steering shaft 2a is rotatably supported on the inner side of a steering column 3a via a plurality of rolling bearings (not illustrated). A steering wheel 1 is fixed to a rear-end portion of the steering shaft 2a that protrudes farther toward the rear than a rear-end opening of the steering column 3a. The steering shaft 2a is constructed by combining an inner shaft 26 and an outer shaft 27 by spline engagement or the like so that rotational force can be transmitted and relative displacement in the axial direction is possible. The inner shaft 26 and the outer shaft 27 relatively displace in the axial direction whereby the front-rear position of the steering wheel 1 can be adjusted, as well as the total length of the steering shaft 2a is shortened in the event of a collision.

The steering column 3a is configured as a whole into a hollow cylindrical shape, and a front-side portion of the outer column 29 is loosely fitted to the rear-side portion of the inner column 28 so as to allow relative displacement in the axial direction. The steering column 3a makes it possible to adjust the front-rear position of the steering wheel 1, and in the event of a collision, the overall length, together with the steering shaft 2a, is shortened. A gear housing 14a of the electric assist device 4b is fixed to the front-end portion (left-end portion in FIG. 1) of the inner column 28. The gear housing 14a is supported by a lower bracket 30 fixed to the vehicle body so as to be capable of pivotal displacement about a tilt shaft 31 arranged in the width direction. The width direction refers to the width direction of the vehicle body in which the electric power steering device is assembled, and corresponds to the left-right direction. The tilt shaft 31 is configured from a bolt, a pin or the like.

The outer column 29 is supported by the vehicle body via an upper bracket 32. The upper bracket 32 is supported so as to be detachable from the vehicle body in the forward direction when a strong impact directed in the forward direction is applied. Moreover, the outer column 29 is supported by the upper bracket 32 so as to be movable in the front-rear direction and the vertical direction in order that the front-rear position and the vertical position of the steering wheel 1 can be adjusted. In order for this, long holes for telescopic adjustment 34 that extend in the front-rear direction are provided in a pair of clamped portions 33 provided in the outer column 29. Long holes for tilt adjustment 36 that extend in the vertical direction are provided in a pair of support plate portions 35 of the upper bracket 32 that are arranged on both sides in the width direction of the pair of clamped portions 33. An adjustment rod 37 is inserted in the width direction through the long holes for telescopic adjustment holes 34 and the long holes for tilt adjustment 36. By operating a lever (not illustrated) fixed to the end portion of the adjustment rod 37 to expand or contract in the width direction an expanding/contracting device (not illustrated) arranged around the adjustment rod 37, the force for clamping the pair of clamped portions 33 from both sides in the width direction by the pair of support plate portions 35 can be adjusted. As a result, the outer column 29 can be fixed to the upper bracket 32 or released.

In an unfixed state, the front-rear position of the steering wheel 1 can be adjusted by moving the outer column 29 forward or backward within a range in which the adjustment rod 37 can be displaced inside the long holes for telescopic adjustment 34. Moreover, the vertical position of the steering wheel 1 can be adjusted by moving the steering column 3a up and down within a range in which the adjustment rod 37 can be displaced inside the long holes for tilt adjustment 36. At this time, the steering column 3a is pivotally displaced in the vertical direction around the tilt shaft 31.

The electric assist device 4b for reducing the operating force of the steering wheel 1 is arranged in front of the steering column 3a, and includes a torque sensor 10a, an electric motor 11a, a worm speed reducer 12a, an output shaft 13a, and a gear housing 14a.

The gear housing 14a is configured by connecting a front-side housing 15a and a rear-side housing 16a in the front-rear direction by a plurality of bolts 55 (two in the illustrated example). The gear housing 14a has a hollow donut-shaped worm wheel housing portion 17a, a cup-shaped worm housing portion 18a, a cantilevered support portion 19a, and a cylindrical torque sensor housing portion 41.

The front-side housing 15a is made of synthetic resin, and has a housing cylinder portion 38 and a housing front plate portion 39 of the worm wheel housing portion 17a, the worm housing portion 18a, and the support portion 19a. In other words, the housing cylinder portion 38, the housing front plate portion 39, the worm housing portion 18a, and the support portion 19a are integrally formed of synthetic resin.

The rear-side housing 16a functions as a cover for covering the rear-end opening of the front-side housing 15a, is made of a synthetic resin, and has a housing rear plate portion 40 of the worm wheel housing portion 17a, and a torque sensor housing portion 41 for housing the torque sensor 10a that is arranged on inside of the housing rear plate portion 40. In other words, the housing rear plate portion 40 and the torque sensor housing portion 41 are integrally formed of synthetic resin.

In this example, the rear-side housing 16a is also made of synthetic resin; however, in a case where the gear housing 14a as a whole can be sufficiently reduced in weight, the rear-side housing 16a may be made of a metal such as an iron alloy, an aluminum alloy, or the like.

The worm wheel housing portion 17a is for housing the worm wheel 20a of the worm speed reducer 12a. The worm wheel housing portion 17a has the cylindrical housing cylinder portion 38 that is arranged around the worm wheel 20a, the annular shaped housing front plate portion 39 that is arranged in front of the worm wheel 20a and covers the front-end opening of the housing cylinder portion 38, and the annular shaped housing rear plate portion 40 that is arranged behind the worm wheel 20a and covers the rear-end opening of the housing cylinder portion 38. In this example, the housing cylinder portion 38 and the housing front plate portion 39 are provided in the front-side housing 15a, and the housing rear plate portion 40 is provided in the rear-side housing 16a.

A substantially cylindrical inner-diameter-side cylindrical portion 42 is provided on the inner-peripheral edge portion of the housing front plate portion 39. The inside in the radial direction of the inner-diameter-side cylindrical portion 42 that is located in the center portion in the radial direction of the housing front plate portion 39 is used as a bearing holding hole 43. In addition, a protruding portion 44 that protrudes forward compared to the portion that is adjacent on the outside in the radial direction is provided at the opening edge portion of the bearing holding hole 43 of the front surface of the housing front plate portion 39. The front surface (tip-end surface) of the protruding portion 44 is a flat surface that exists on a virtual plane that is orthogonal to the center axis of the worm wheel housing portion 17a. Moreover, the outline shape as seen from the front of the protruding portion 44 has a substantially rectangular shape (reverse arch shape) in which one side (lower side) of four sides has a circular arc shape.

The worm housing portion 18a is for housing the worm shaft 21 of the worm speed reducer 12a, the internal space thereof connects with the internal space of the worm wheel housing portion 17a. The worm housing portion 18a is provided at a portion in the circumferential direction of the outer-diameter-side portion of the worm wheel housing portion 17a, that is positioned on the side of the output shaft 13a in the width direction of the vehicle body in the assembled state of the electric power steering device. The center axis of the worm housing portion 18a is directed in the vertical direction and is in a skewed position with respect to the center axis of the worm wheel housing portion 17a. Moreover, the opening portion of the worm housing portion 18a faces upward in the assembled state of the electric power steering device. A motor mounting flange 45 that projects outward in the radial direction is provided at the opening-side end portion of the worm housing portion 18a.

The motor mounting flange 45 supports the electric motor 11a and a control device 46 having a built-in substrate.

The support portion 19a is part of a tilt mechanism, and performs cantilevered support of the gear housing 14a with respect to the vehicle body so as to be capable of pivotal displacement. The support portion 19a is provided so as to protrude forward from the upper portion of the front surface of the housing front plate portion 39 in a substantially perpendicular direction to the front surface of the housing front plate portion 39. In addition, the support portion 19a includes a protruding plate portion 47, a pair of side plate portions 48, and a support cylinder portion 49.

The protruding plate portion 47 is arranged substantially horizontally above the opening portion of the bearing holding hole 43 and extends toward the front from the front surface of the housing front plate portion 39. In addition, the base end portion (root portion) of the lower surface of the protruding plate portion 47 is connected to the upper end portion of the front surface of the protruding portion 44 provided on the housing front plate portion 39 so as to be substantially orthogonal. The pair of side plate portions 48 is provided on both sides in the width direction of the protruding plate portion 47, and is arranged substantially at right angles to the protruding plate portion 47. The support cylinder portion 49 is configured into a substantially cylindrical shape, and is provided at a front-end portion of the protruding plate portion 47 between the pair of side plate portions 48 in a state where the center axis thereof is arranged substantially horizontally. A support hole 62 that is a through hole for inserting the tilt shaft 31, is provided in the center portion of the support cylinder portion 49. The width dimension of the support portion 19a is the same as the width dimension of the protruding portion 44. Therefore, the pair of side plate portions 48 of the support portion 19a and both side surfaces in the width direction of the protruding portion 44 are connected in the vertical direction.

Particularly in this example, of the continuous portion 50 of the housing front plate portion 39 and the support portion 19a, a reinforcing member 52 made of metal plate is provided in the corner portion 51 that exists between the front surface of the protruding portion 44 provided on the housing front plate portion 39 and the bottom surface of the protruding plate portion 47 of the support portion 19a. The corner portion 51 connecting the front surface of the protruding portion 44 and the lower surface of the protruding plate portion 47 is curved in a concave circular arc shape.

The reinforcing member 52 is made, for example, by bending a metal plate by pressing or the like, and has a shape bent substantially at a right angle. The reinforcing member 52 has a main body plate portion 53 and a pair of bent portions 54. The main body plate portion 53 is bent at a substantially right angle along the corner portion 51, and has a front plate reinforcing portion 64 covering the entire upper end portion of the front surface of the protruding portion 44 over the entire width, a support portion reinforcing portion 65 covering half of the base portion (rear half portion) of the lower surface of the protruding plate portion 47 over the entire width, and a curved portion 66 curved in an circular arc shape that smoothly connects the upper end portion of the front plate reinforcing portion 64 and the rear-end portion of the support portion reinforcing portion 65. The reinforcing member 52 of this example has a substantially L shape, and the length dimension (front-rear dimension) of the support portion reinforcing portion 65 is larger than the length dimension (vertical dimension) of the front plate reinforcing portion 64. The pair of bent portions 54 is provided so as to be bent in the same direction and at substantially right angles from both sides in the width direction of the main body plate portion 53. The bent portion 54 covers the lower end portion of half of the base portion (rear half portion) of the support portion 19a and the upper end portion of the protruding portion 44 from both sides in the width direction. In the example illustrated in the figures, the support portion reinforcing portion 65 is used that has a length that can cover half of the base portion of the lower surface of the protruding plate portion 47, however, the length dimension may be made shorter to cover only the base end portion of the lower surface of the protruding plate portion 47, or the length dimension may be made longer to cover the entire lower surface of the protruding plate portion 47. Moreover, the length of the front plate reinforcing portion 64 may be made longer so as to cover the upper half portion of the front surface of the protruding portion 44 or to cover the entire front surface of the protruding portion 44.

Figure 1:
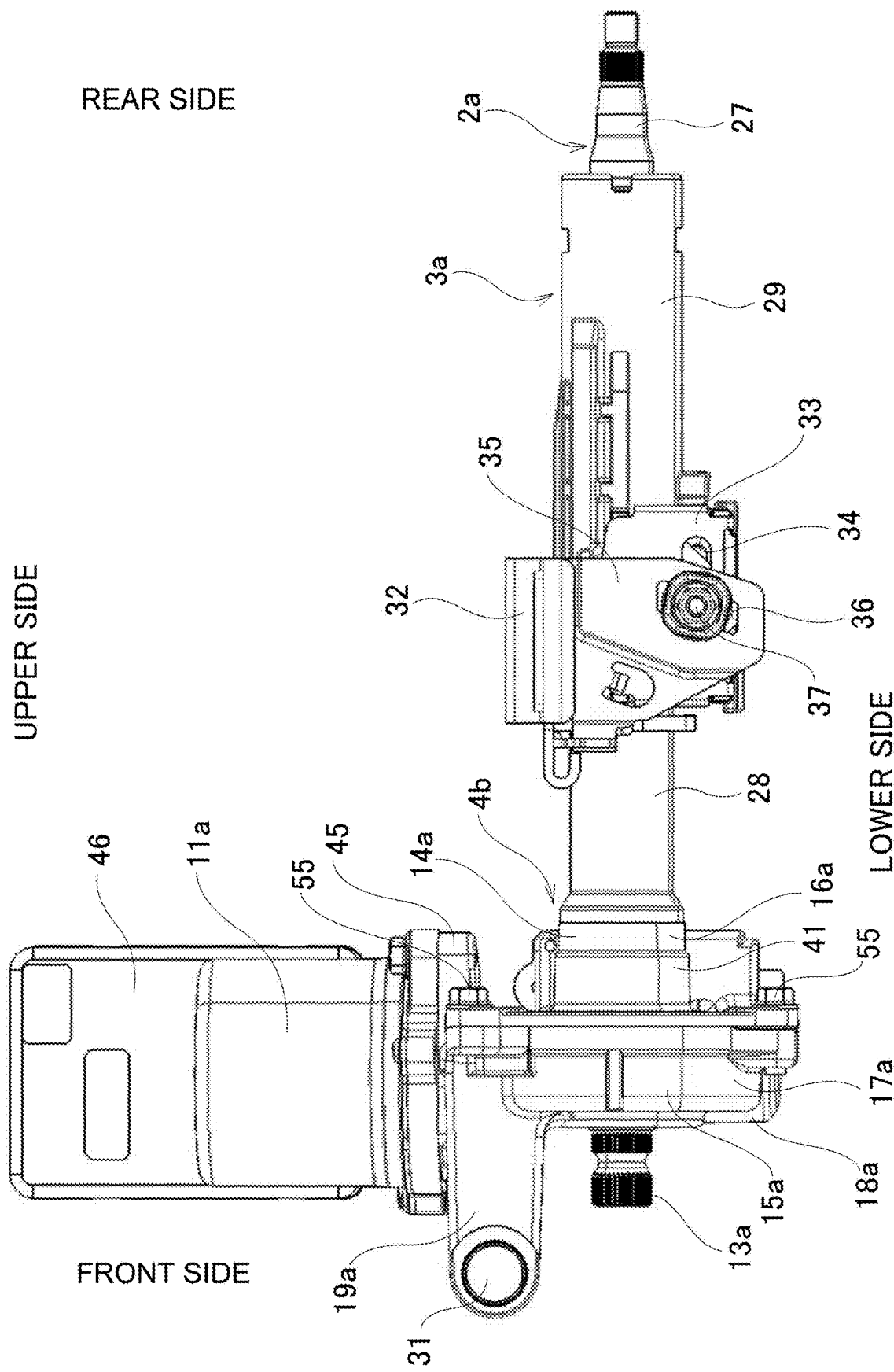
FIG. 1 is a side view of an electric power steering device of a first example of an embodiment of the present invention.
Figure 2:
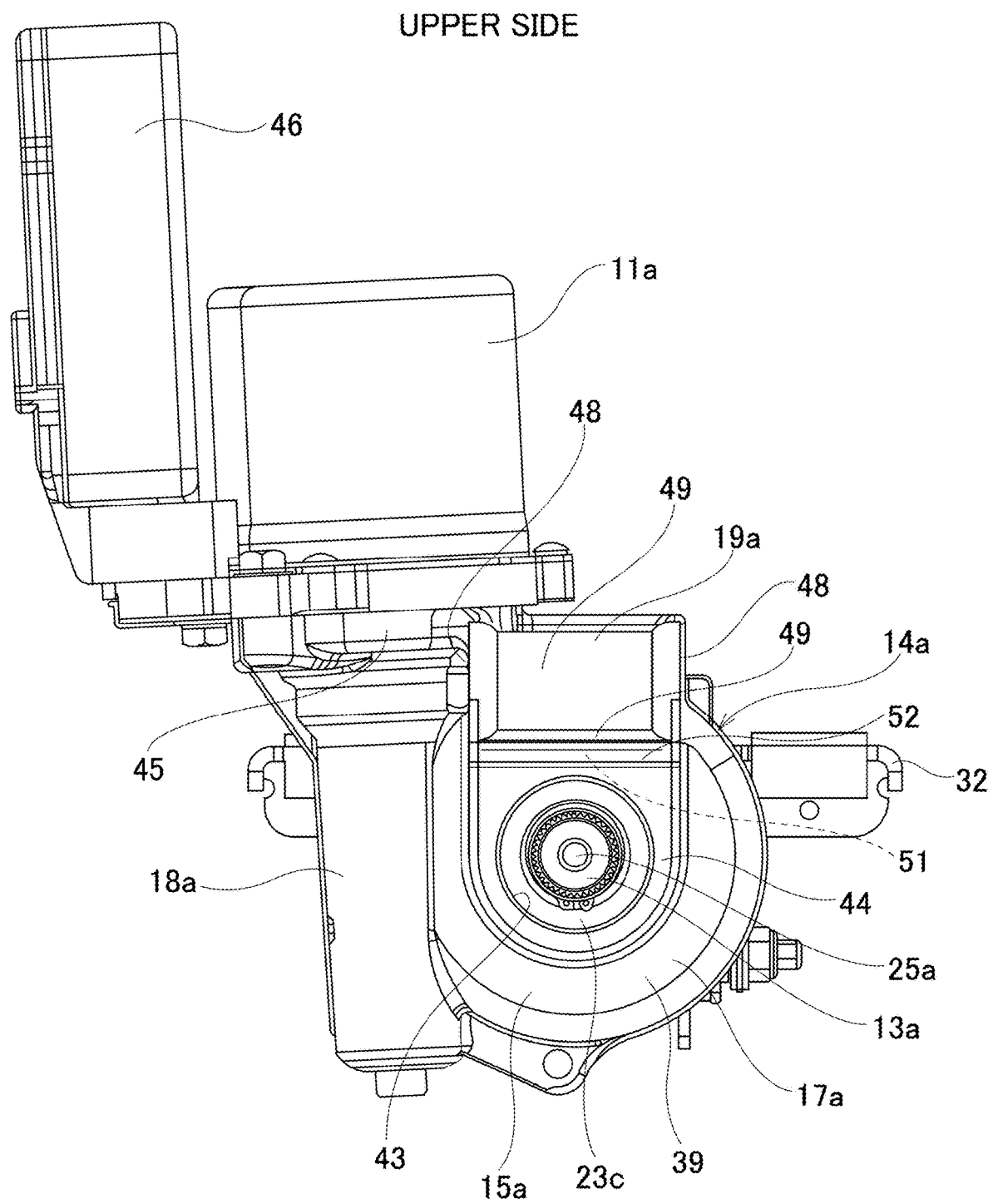
FIG. 2 is a view of the electric power steering device of the first example as viewed from the front side.
Figure 3:
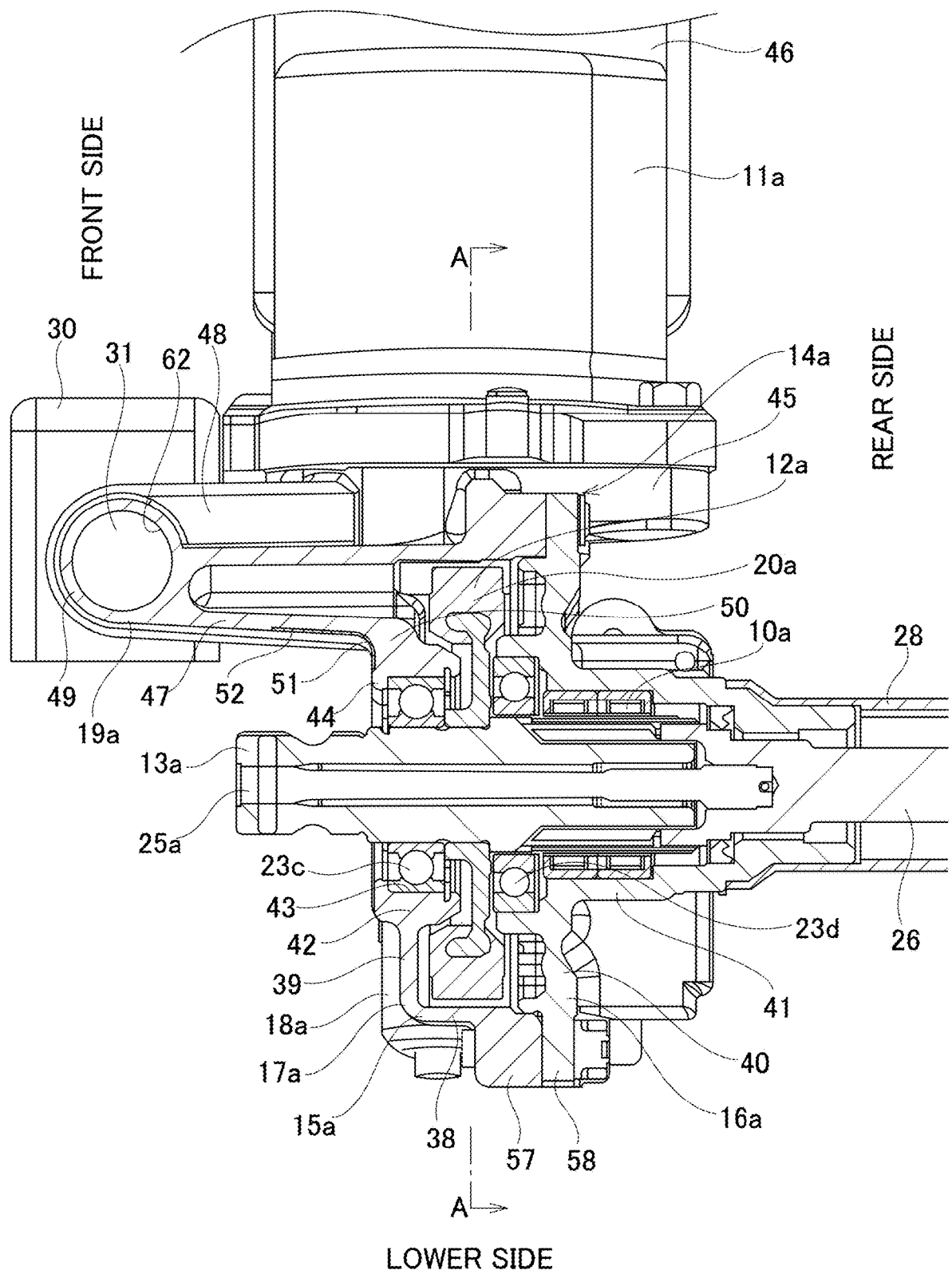
FIG. 3 is a cross-sectional view of a main part of the electric power steering device of the first example.
Figure 4:
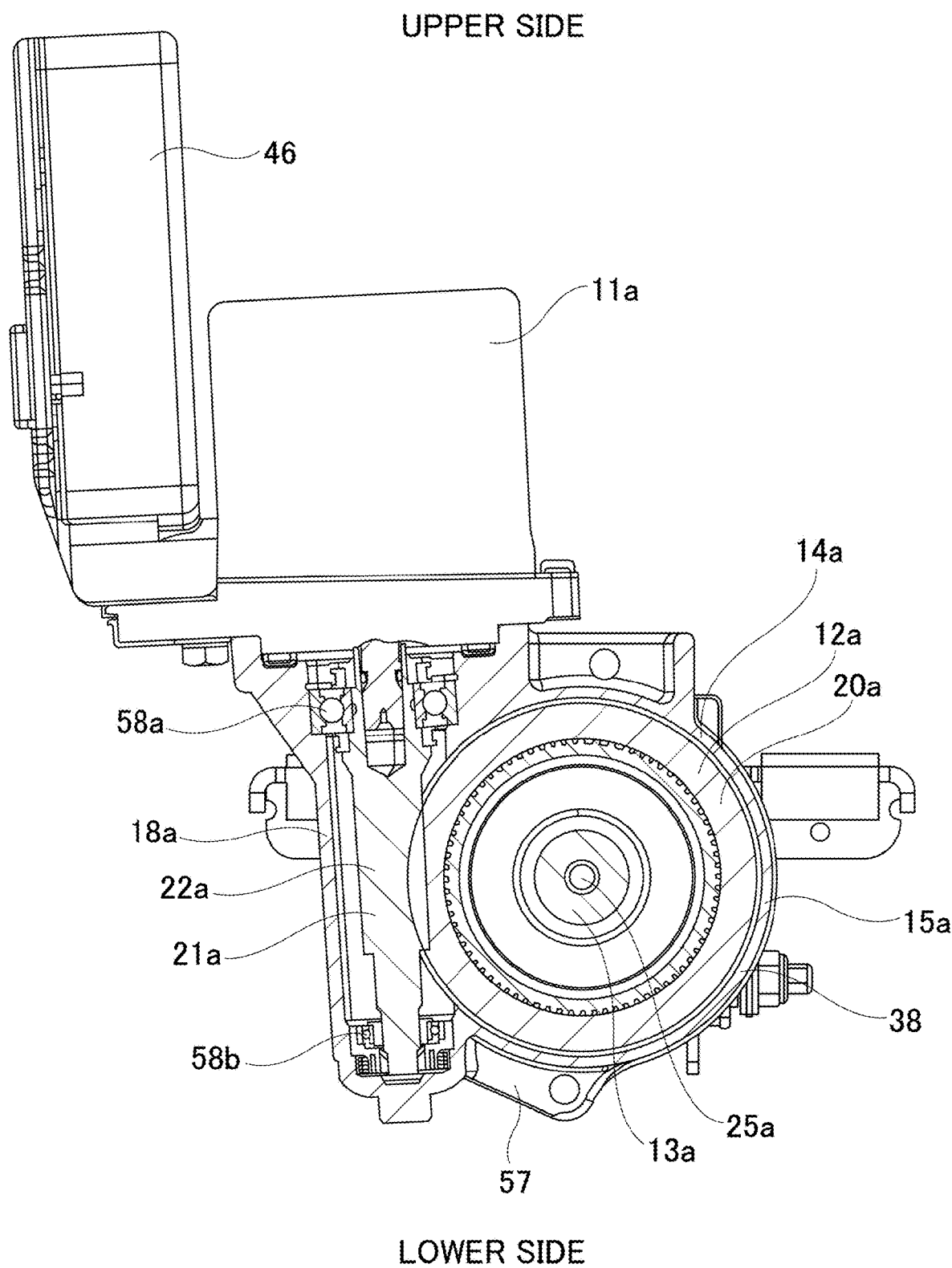
FIG. 4 is a cross-sectional view taken along the section line A-A in FIG. 3.
Figure 5:
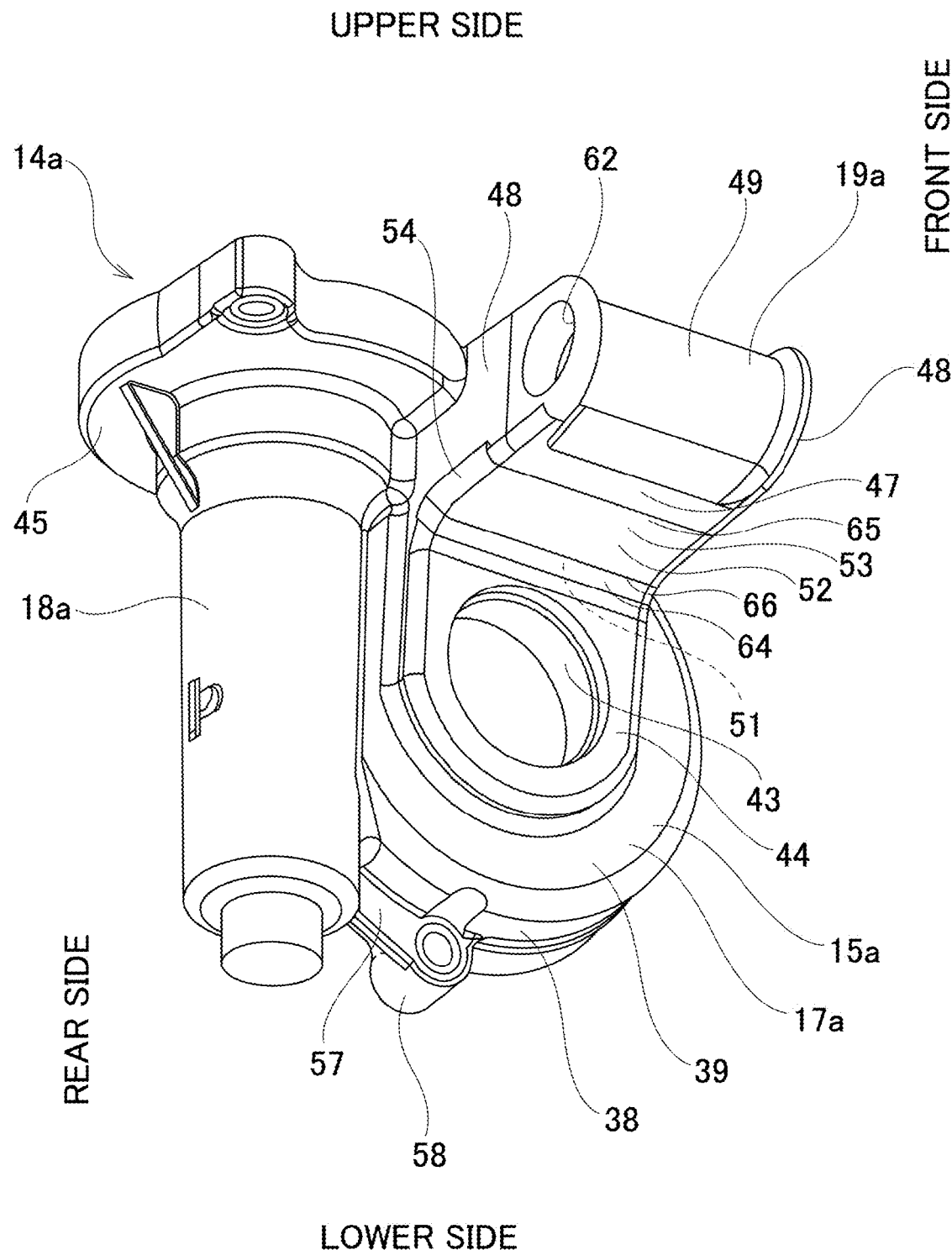
FIG. 5 is a perspective view of a gear housing removed from the electric power steering device of the first example as seen from the front.
Figure 6:
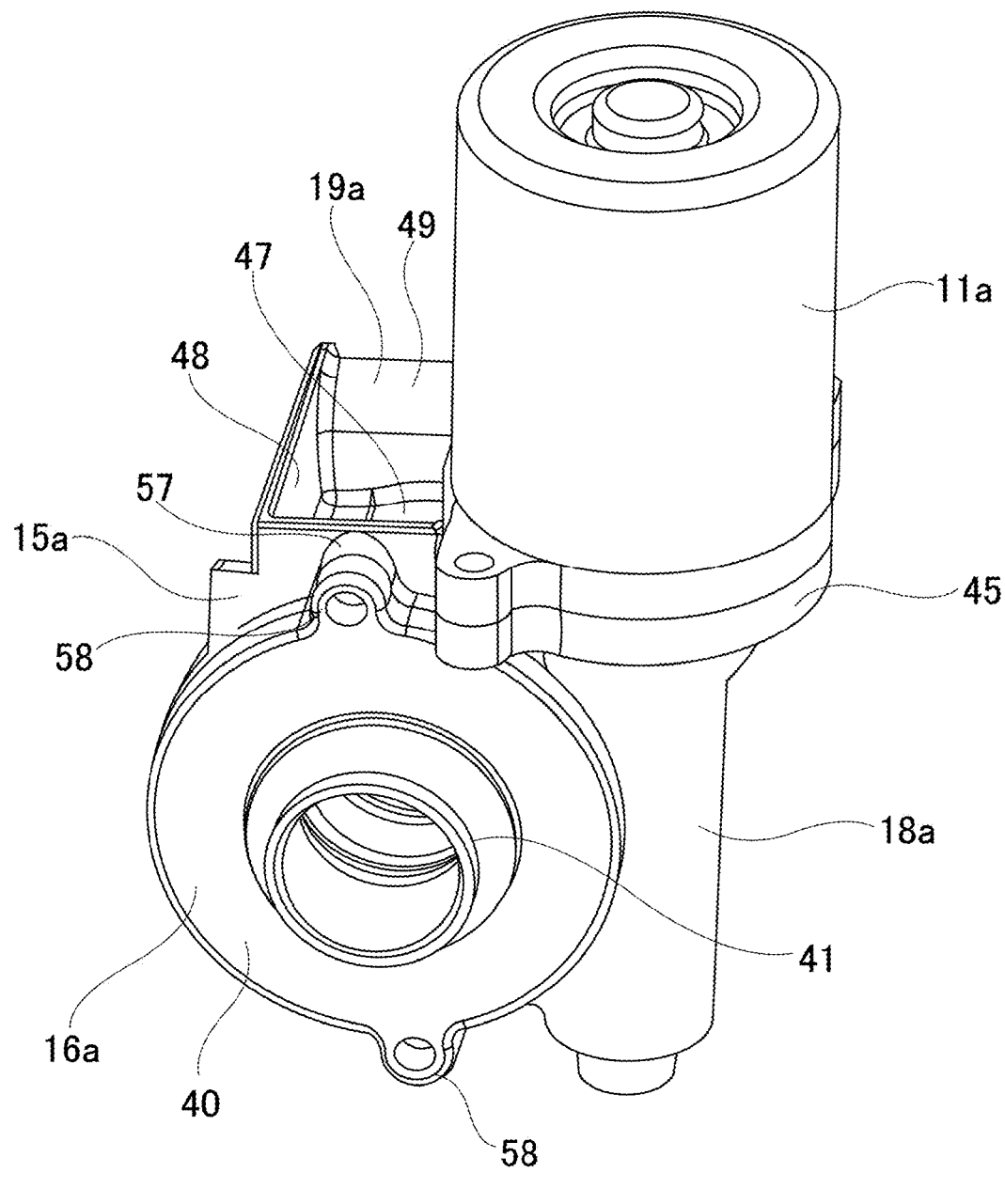
FIG. 6 is a perspective view an electric motor and the gear housing removed from the electric power steering device of the first example as seen from the rear.
Figure 7:
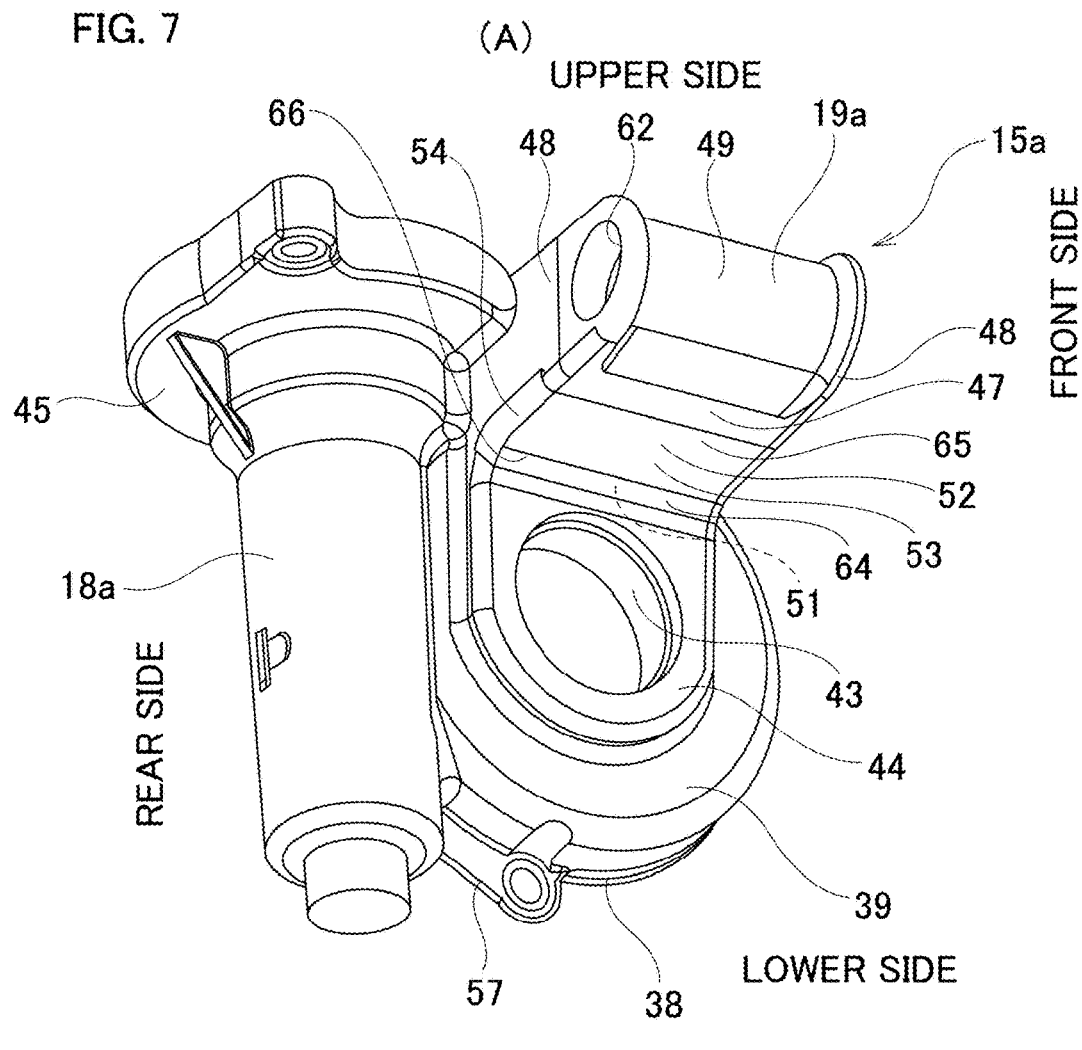
FIG. 7A is a perspective view of a front-side housing removed from the gear housing of the first example.
FIG. 7B is a perspective view of a rear-side housing removed from the gear housing of the first example of an embodiment.
Figure 7:
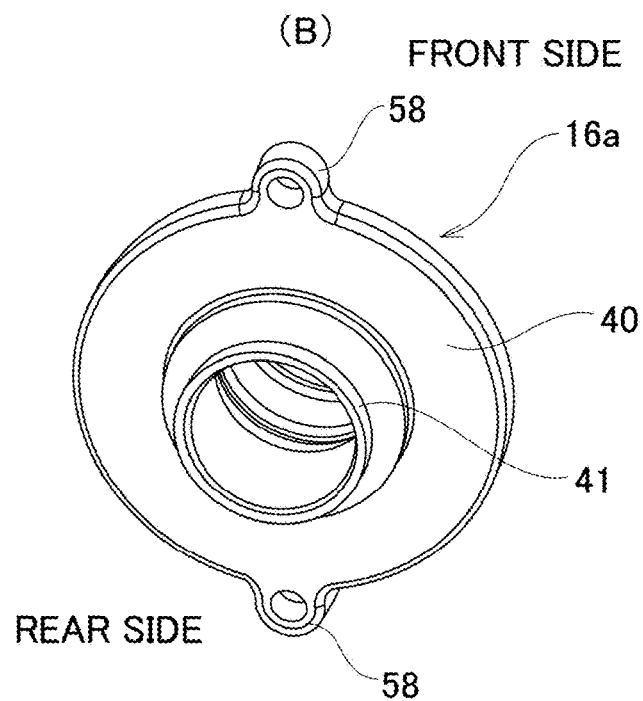
Figure 8:
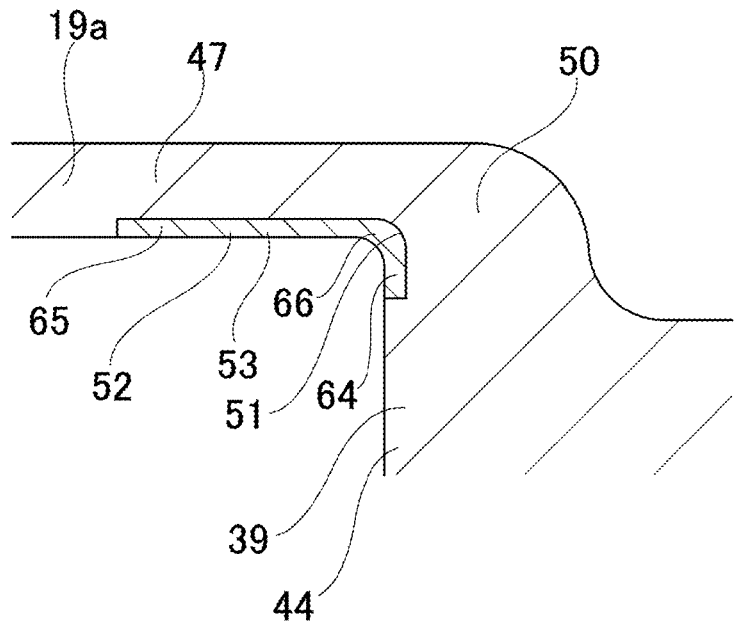
FIG. 8 is a partially enlarged view of FIG. 3.
Figure 9:
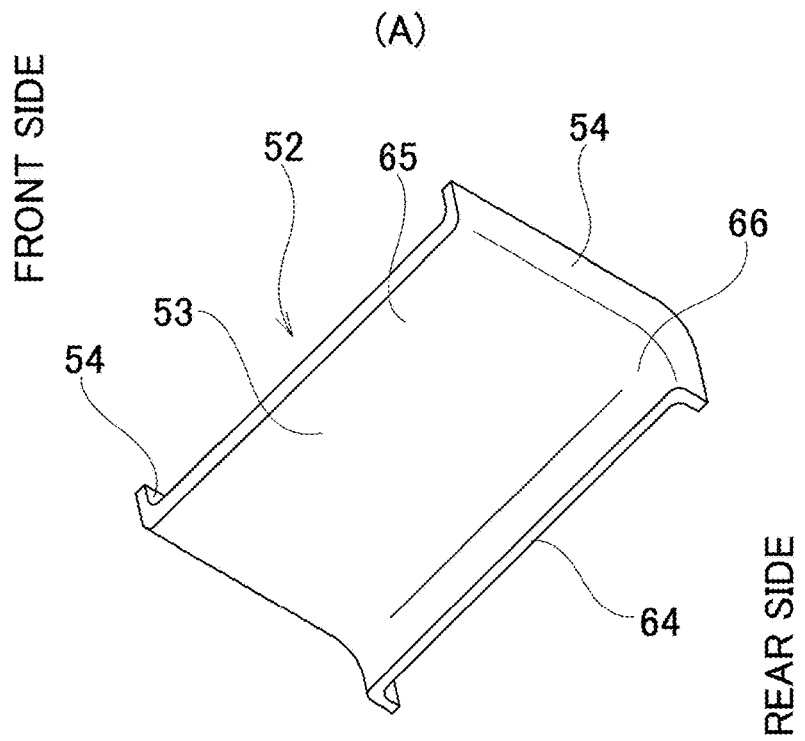
FIGS. 9A and 9B are perspective views of a reinforcing member removed from the gear housing of the first example; where
Figure 9:
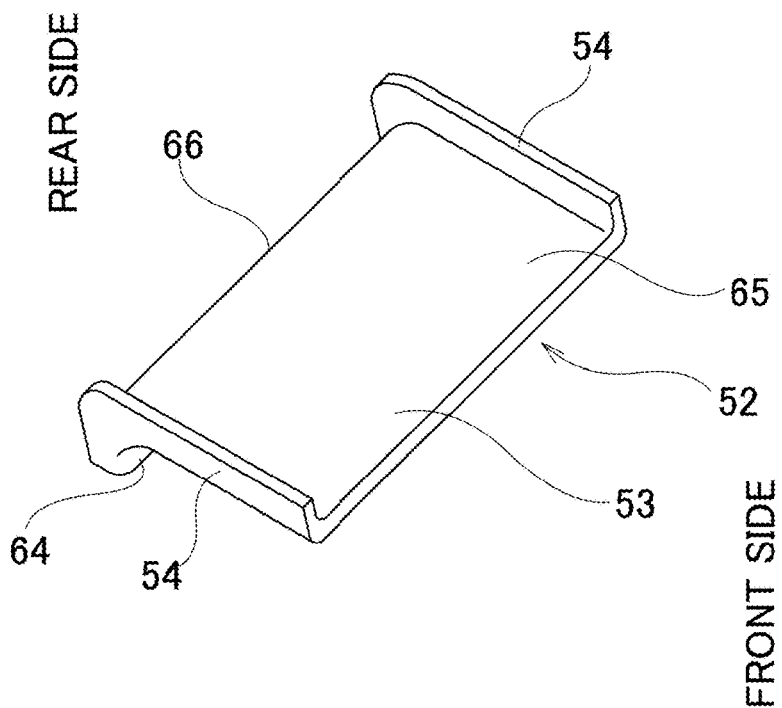
Figure 10:
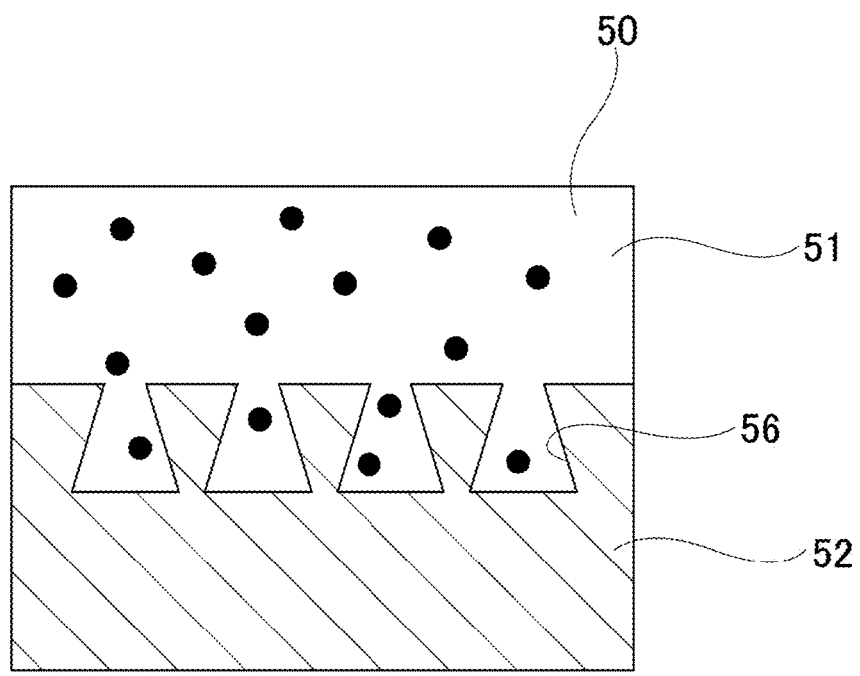
FIG. 10 is a cross-sectional schematic view for describing a case where a reinforcing member is joined to a corner portion by an anchor effect in the first example.

A specific method for providing the reinforcing member 52 as described above in the corner portion 51 of the front-side housing 15a is not particularly limited. For example, in a state where the reinforcing member 52 is inserted into an injection mold for making the front-side housing 15a, by filling the mold with synthetic resin material, the front-side housing 15a and the reinforcing member 52 are integrated by the insert molding, and the reinforcing member 52 may be provided in the corner portion 51. In addition, when performing this kind of insert molding, a surface roughening process may be performed on the reinforcing member 52 in advance to form a minute uneven portion 56 on the surface of the reinforcing member 52 as illustrated schematically in FIG. 10. As a result, part of the synthetic resin can be made to enter into the concave portions of the minute uneven portion 56, so the reinforcing member 52 may be firmly joined to the corner portion 51 by an anchor effect. Note that what is illustrated by the aventurine pattern in FIG. 10 is a fiber reinforcing material that is included in the synthetic resin. Alternatively, after the front-side housing 15a is manufactured by injection molding, the reinforcing member 52 may be bonded and fixed to the corner portion 51 using an adhesive such as an epoxy resin or the like. Furthermore, insert molding (joining) may also be performed in a state where an adhesive is applied to the reinforcing member 52. Moreover, in this example, as illustrated in FIG. 8, the reinforcing member 52 is provided so as to be flush with the portion of the front-side housing 15a that is not covered by the reinforcing member 52, however, the reinforcing member 52 may be provided, for example, so as to protrude by a thickness dimension (plate thickness) from a portion of the front-side housing 15a not covered by the reinforcing member 52.

In this example, the front-side housing 15a and the rear-side housing 16a as described above are connected to each other by a plurality of bolts 55 (two in the illustrated example). More specifically, a plurality (two in the illustrated example) of front-side coupling flanges 57 that are provided on the outer-circumferential surface of the housing cylinder portion 38 of the front-side housing 15a, and a plurality (two in the illustrated example) of rear-side coupling flanges 58 provided on the outer-circumferential edge of the housing rear plate portion 40 of the rear-side housing 16a, are connected to each other by bolts 55.

In this example, the output shaft 13a is rotatably supported by a pair of rolling bearings 23c, 23d inside the gear housing 14a having the configuration described above. Of the pair of rolling bearings 23c, 23d, the rolling bearing 23c on the front side is fitted inside and held in a bearing holding hole 43 of the front-side housing 15a, and the rolling bearing 23d on the rear side is fitted inside and held in the housing rear plate portion 40 of the rear-side housing 16a. In addition, the outer ring of the rolling bearing 23c on the front side is fitted inside and fixed to an intermediate portion in the axial direction of the inner-circumferential surface of the bearing holding hole 43. Furthermore, the outer ring of the rolling bearing 23c on the front side is held on both sides by a rearward facing stepped surface that is provided in a portion near the front end of the bearing holding hole 43, and a retaining ring that is locked in a locking groove provided in a portion near the rear end of the inner-circumferential surface of the bearing holding hole 43. The output shaft 13a is connected to the front-end portion of the inner shaft 26 of the steering shaft 2a via a torsion bar 25a. A universal joint 5a is connected to a portion of the front-end portion of the output shaft 13a that protrudes outside the gear housing 14a.

The worm wheel 20a of the worm speed reducer 12a is externally fitted and fixed between the pair of rolling bearings 23c, 23d at an intermediate portion of the output shaft 13a. In this state, the worm wheel 20a is arranged inside the worm wheel housing portion 17a of the front-side housing 15a. The worm shaft 21a that constitutes the worm speed reducer 12a with the worm wheel 20a is rotatably supported inside the worm housing portion 18a via a pair of rolling bearings 58a, 58b. In this state, the worm 22a provided at an intermediate portion of the worm shaft 21a engages with the worm wheel 20a. In addition, the output shaft of the electric motor 11a is connected to the base end portion of the worm shaft 21a. As a result, the auxiliary power of the electric motor 11a may be transmitted to the worm wheel 20a. The electric motor 11a is supported and fixed to the gear housing 14a by using a motor mounting flange 45 of the front-side housing 15a.

The torque sensor 10a is arranged around the front-end portion of the inner shaft 26 inside the torque sensor housing portion 41 of the rear-side housing 16a. The electric motor 11a rotates and drives the worm shaft 21a according to the direction and magnitude of a steering torque applied from the steering wheel 1 to the steering shaft 2a, which is detected by the torque sensor 10a, and supplies auxiliary power (auxiliary torque) to the output shaft 13a. As a result, the operating force of the steering wheel 1 that is required when applying a steering angle to the pair of left and right steered wheels is reduced.

According to the electric power steering device of this example having the configuration described above, the gear housing 14a can be reduced in weight, and the strength of the continuous portion 50 between the housing front plate portion 39 and the support portion 19a of the worm wheel housing portion 17a can be increased.

In other words, in this example, the front-side housing 15a and the rear-side housing 16a of the gear housing 14a are each made of synthetic resin having a density lower than that of metal, so that the gear housing 14a can be sufficiently reduced in weight.

In addition, the reinforcing member 52 made of metal plate is provided in the corner portion 51 between the housing front plate portion 39 and the support portion 19a where stress is likely to be concentrated due to external forces such as road surface reaction force, meshing reaction force or the like applied to the gear housing 14a. Therefore, the corner portion 51 made of synthetic resin may be reinforced by the metal reinforcing member 52. Thus, even in a case where an external force such as a road surface reaction force, a meshing reaction force or the like is applied to the gear housing 14a, the deformation amount of the support portion 19a can be suppressed. As a result, the strength of the continuous portion 50 can be increased, and the early occurrence of damage such as cracking and the like in the corner portion 51 may be effectively prevented.

Moreover, a pair of bent portions 54 is provided on both side portions in the width direction of the reinforcing member 52, so the torsional rigidity of the reinforcing member 52 may be increased. Therefore, even in a case where a force twisting the support portion 19a acts on the gear housing 14a due to the meshing reaction force that acts on the worm wheel 20a when the worm shaft 21a is rotated and driven in the forward direction or the reverse direction, the amount of twist deformation of the support portion 19a may be effectively suppressed. Therefore, this is advantageous from the aspect of improving the strength of the continuous portion 50, and from the aspect of preventing damage of the corner portion 51.

Furthermore, the rigidity of the support portion 19a may be increased, so the behavior of the contraction operation of the steering shaft 2a and the steering column 3a may be stabilized. In addition, the occurrence of vibration and abnormal noise may also be suppressed.

Next, materials that can be used for the front-side housing 15a and the rear-side housing 16a, and materials that can be used for the reinforcing member 52 will be described with specific examples.

[Materials that Can be Used for the Front-Side Housing 15a and the Rear-Side Housing 16a]

As a resin material used for the front-side housing 15a and the rear-side housing 16a, preferably a resin composition that includes a thermoplastic resin and a fiber reinforcing material is used. The kind of resin to be used is not particularly limited, however, from the aspect of heat resistance, polyamide resin, thermoplastic polyimide, polyether ether ketone (PEEK), polyphenylene sulfide resin (PPS) and the like may be preferably used. Moreover, even among these, polyphenylene sulfide resin (PPS) is more preferable from the aspect of less strength reduction and less dimensional change due to water absorption. Specific examples of the polyamide-based resin include nylon (registered trademark) 6, nylon 11, nylon 12, nylon 66, nylon 610, nylon 612, nylon 46, and the like. Furthermore, examples of a semi-aromatic nylon having lower water absorption and moisture absorption than these aliphatic polyamides, include semi-aromatic nylons obtained by partially copolymerizing terephthalic acid with an adipic acid unit such as nylon 6T/66, nylon 6T/61, nylon 6T/61/66, nylon 6T/M-5T, nylon 6T, nylon 9T and the like.

Examples of fiber reinforcing material include inorganic fibers such as glass fiber, carbon fiber, silicon carbide fiber, alumina fiber, boron fiber, metal fiber (metal types are stainless steel, iron, aluminum) and the like, and organic fibers such as aramid fiber, aromatic polyimide fiber, liquid crystal polyester fibers and the like. Among these fiber reinforcing materials, glass fibers and carbon fibers are preferable because good reinforcing properties can be obtained. Moreover, of these fiber reinforcing materials, one type may be used individually, or two or more types may be used together. Furthermore, in addition to the fiber reinforcing material, a whisker-like reinforcing material such as potassium titanate whisker or the like may be used.

The content of the fiber reinforcing material with respect to the resin material is preferably no less than 10% by mass and no greater than 60% by mass. When the content is less than 10% by mass, there is a possibility that the mechanical strength and dimensional stability of the resin material may be insufficient. Moreover, when the content of the fiber reinforcing material is small, there is a possibility that the difference in the linear expansion coefficient between the resin material and the metal insert part such as the reinforcing member 52 or the like will be large, the thermal stress generated by temperature change will increase, thus separation of parts or damage to the resin material will occur. On the other hand, when the content of the fiber reinforcing material exceeds 60% by mass, not only the toughness of the resin material is lowered but also the fluidity of the resin material is lowered. When the fluidity is lowered, the resin material is less likely to enter the minute uneven portions on the joining surface, and the joining force may be reduced. In order to make it difficult for such inconvenience to occur, the content of the fiber reinforcing material is preferably no less than 30% and no more than 50% by mass.

In order to improve the physical properties of this kind of a resin composition, various additives may be added depending on the purpose. In some cases, the gear housing 14a may be used under a situation where a thermal shock of, for example, about −40° C. to 100° C. is repeatedly applied. Therefore, in order to improve the reliability in such a situation, a soft component may be mixed in as an impact strength improver in thermoplastic resin to be a polymer alloy. As the soft component, rubber-like substance such as acrylic rubber, maleic anhydride-modified ethylene propylene non-conjugated diene rubber, carboxyl-modified hydrogenated nitrile rubber may be mixed in. The mixing amount of the soft component is preferably no less than 5% by mass and no greater than 50% by mass of the entire resin composition. When the content of the soft component is less than 5% by mass, it is possible that the thermal shock resistance may become insufficient, and when the content of the soft component exceeds 50% by mass, it is possible that physical properties such as strength, rigidity, heat resistance, or the like may be adversely affected.

Moreover, an antioxidant may be mixed in the resin composition for the purpose of suppressing oxidative degradation of thermoplastic resin. The kind of antioxidant is not specifically limited, however, examples may include an amine-based antioxidant, a phenolic-based antioxidant, a hydroquinone-based antioxidant, and the like. Furthermore, a peroxide-decomposable antioxidant (secondary antioxidant) may be used in combination with amine-based, phenol-based, and hydroquinone-based antioxidants in the resin composition.

The mixing amount of the antioxidant as described above is preferably about 0.1% by mass to 3.0% by mass with respect to the resin composition, however, depending on the kind of antioxidant, an amount larger than that may be added as long as bloom does not occur, and as long as the physical properties of the resin are not adversely affected.

Furthermore, additives such as described below may be mixed in with the resin composition. For example, solid lubricants (graphite, hexagonal boron nitride, fluorine mica, tetrafluoroethylene resin powder, tungsten disulfide, molybdenum disulfide, and the like), inorganic powder, organic powder, lubricating oil, plasticizers, rubber, thermal stabilizers, UV absorbers, photoprotective materials, inorganic or organic flame retardants, antistatic agents, mold release agents, flow improvers, thermal conductivity improvers, non-tackifying agents, crystallization accelerators, nucleating agents, pigments, dye agents, light stabilizers, other reinforcing materials, and the like may be added as appropriate.

In addition, the gear housing 14a may house an electric motor control unit (ECU) of an electric machine. In this case, in order to prevent malfunction of the control device, the gear housing 14a may be required to have electromagnetic wave shielding properties. However, since most resin materials are not electrically conductive, there is a possibility that the shielding properties may be insufficient. Therefore, in order to ensure shielding properties, a metal film may be formed on the surface of the gear housing 14a. The type of metal and the coating method are not particularly limited, however, examples of the type of metal include copper (Cu) and nickel (Ni), and examples of the coating method include electrolytic plating, electroless plating, vapor deposition, and the like.

[Materials that Can be Used for the Reinforcing Member 52]

Examples of the metal material of the reinforcing member 52 include carbon steel for mechanical structures such as S53C and the like, bearing steel such as SUJ2 and the like, cold rolled steel plate such as SPCC and the like, stainless steel such as SUS430 and the like, aluminum alloy, magnesium alloy and the like. Of these, a cold-rolled steel plate (SPCC) that is excellent in press workability and advantageous in terms of cost may be preferably used. Moreover, surface treatment for rust prevention, such as triiron tetroxide coating, zinc plating, nickel chrome plating, electroless nickel plating, rust prevention paint, or the like may be performed on the reinforcing member 52 within a range that does not adversely affect the joint with the corner portion 51 made of synthetic resin.

Second Example

The second example of an embodiment will be described with reference to FIGS. 11A, 11B, and FIG. 12.

As described in the first example, in a case where, of the front-side housing 15a made of synthetic resin, the continuous portion 50 in which stress is easily concentrated is reinforced by a metal reinforcing member 52, the strength of the continuous portion 50 may be increased. However, at the boundary portion (hereinafter referred to as a joining boundary portion) of the front-side housing 15a where the reinforcing member 52 is joined, when the size of the reinforcing member 52 is too small, it is considered possible that the concentrated stress (tensile stress) will not be supported and that the stress will increase. Therefore, in this example, examination is performed through simulation analysis (FEM analysis) to determine whether or not the stress acting on the joining boundary portion of the front-side housing 15a can be reduced by changing the length dimension of the reinforcing member 52 (the length dimension of the support portion reinforcing portion 65). Furthermore, in this example, the relationship between the radius of curvature of the curved portion 66 of the reinforcing member 52 and the stress acting on the joining boundary portion of the front-side housing 15a was also found. The simulation conditions are as described below

[Dimensions and Material of the Front-Side Housing 15a (Young's Modulus)]

Figure 11:
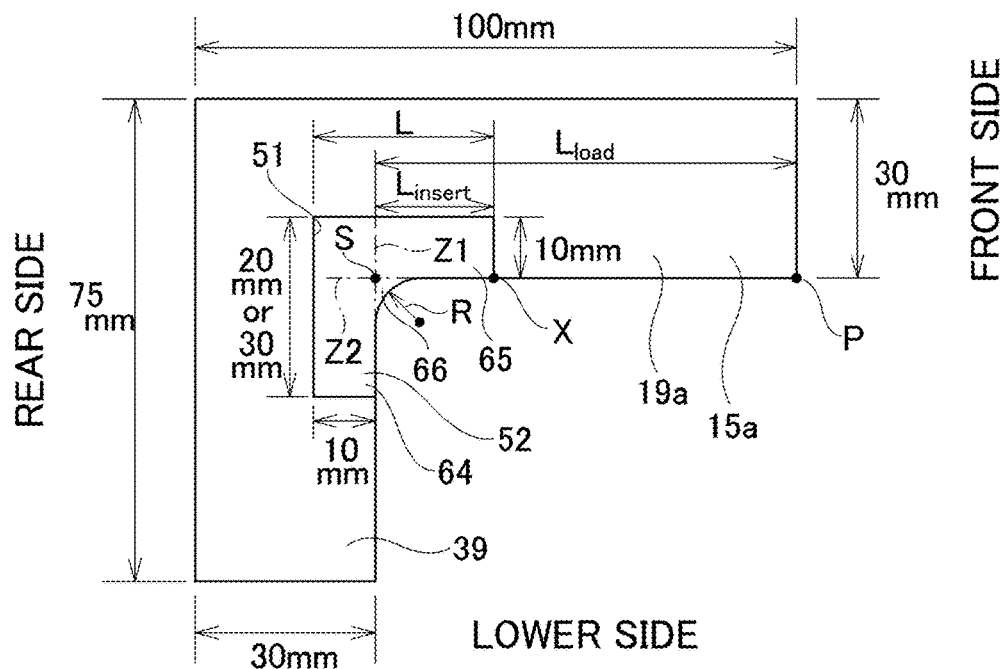
FIG. 11A and FIG. 11B are views illustrating a modeled front-side housing and reinforcing member used for the simulation analysis in a second example of the embodiment, where
Figure 11:
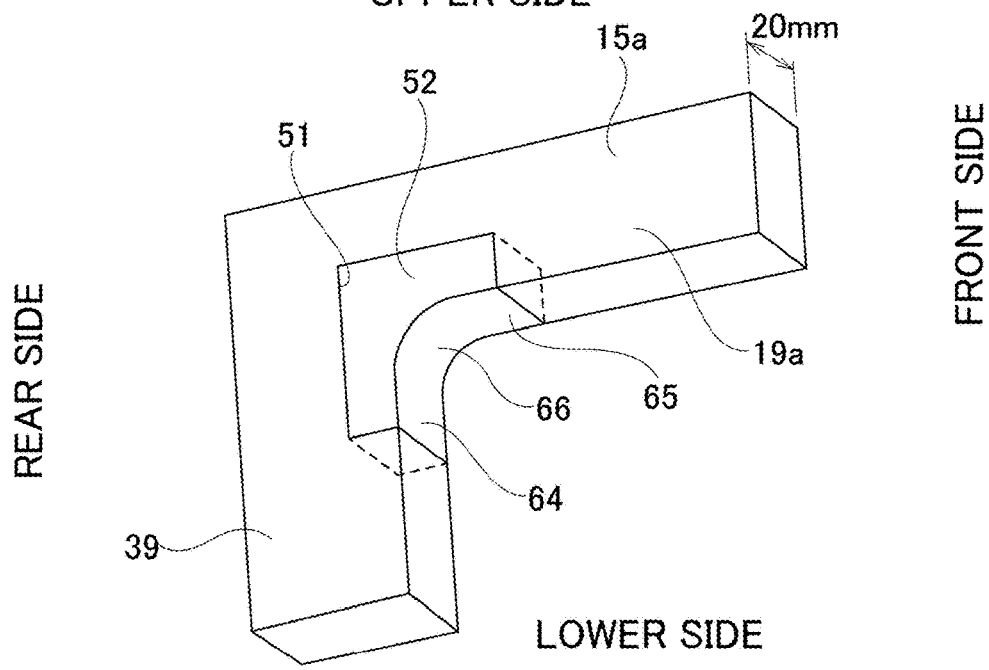

In this example, the front-side housing 15a is modeled in a substantially L-shaped plate shape as illustrated in FIG. 11A and FIG. 11B. More specifically, the front-side housing 15a includes a vertical plate-shaped housing front plate portion 39 that extends in the vertical direction, and a horizontal plate-shaped support portion 19a that extends in the front-rear direction (left-right direction in FIG. 11A and FIG. 11B) from the upper end portion of the housing front plate portion 39. The front-side housing 15a has a vertical dimension of 75 mm, a front-rear dimension of 100 mm, and a width dimension of 20 mm. Furthermore, the thickness dimension in the front-rear direction of housing front plate portion 39 is 30 mm, and the thickness dimension in the vertical direction of the support portion 19a is 30 mm. In addition, the material of the front-side housing 15a is a polyphenylene sulfide resin (PPS) having a glass fiber content of 40% by weight, and having a Young's modulus of 15,500 MPa and a Poisson's ratio of 0.36.

[Dimensions and Material of the Reinforcing Member 52 (Young's Modulus)]

The reinforcing member 52 is also modeled in a substantially L-shaped plate shape as illustrated in FIG. 11A and FIG. 11B in accordance with the shape of the front-side housing 15a to be inserted. In this example, the length dimension of the reinforcing member 52 is varied by changing the front-rear dimension L of the reinforcing member 52 in order to examine the influence of the length dimension on the stress acting on the joining boundary portion of the front-side housing 15a. More specifically, the front-rear dimension L of the reinforcing member 52 is set to 20 mm, 30 mm, 50 mm, and 70 mm. In addition, in the case where the front-rear dimension L of is set to 20 mm, the vertical dimension of the reinforcing member 52 is set to 20 mm, and in all other cases is set to 30 mm. The width dimension and the thickness dimension of the reinforcing member 52 are constant regardless of the front-rear dimension L of the reinforcing member 52, with the width dimension being set to 20 mm, and the thickness dimension being set to 10 mm. Moreover, the material of the reinforcing member 52 is carbon steel having a Young's modulus of 208,000 MPa and a Poisson's ratio of 0.29.

[Radius of Curvature of the Curved Portion 66]

In order to examine the influence of the radius of curvature of the curved portion 66 on the stress acting on the joining boundary portion of the front-side housing 15a, the radius of curvature R of the curved portion 66 is varied and set to 5 mm, 10 mm, and 20 mm.

[Load Application Point and Stress Measurement Position]

In the simulation of this example, the rear end surface (the left end surface in FIG. 11A and FIG. 11B) of the housing front plate portion 39 is a fixed surface, and the lower portion of the front end surface of the support portion 19a is set to the application point P where an upward load (10000 N) is applied. Then, in a case where a load is applied to such an application point P, the value of the stress acting on the joining boundary portion of the front-side housing 15a, which is a resin part, is found. More specifically, of the front-side housing 15a, the stress at the joining boundary portion X joined with the front-end portion of the support portion reinforcing portion 65 is found. Note that, the application point P is a position in a support hole 62 (refer to FIG. 3) provided in the support portion 19a corresponding to a contact portion that comes in contact with the tilt shaft 31 (refer to FIG. 3) that functions as the center of pivoting.

[Other Conditions]

The front-rear dimension L of the reinforcing member 52 includes the thickness dimension (10 mm) of the reinforcing member 52 that does not change even when the front-rear dimension L is changed. Therefore, in order to correctly evaluate the change in the front-rear dimension L of the reinforcing member 52, an intersecting point of an extension line Z1 on the front surface of the front plate reinforcing portion 64 of the reinforcing member 52 and an extension line Z2 on the lower surface of the support portion reinforcing portion 65 is defined as a reference point S, and the length dimension from the reference point S to the front-end portion of the support portion reinforcing portion 65 is defined as $L_{insert}$. In addition, the length dimension from the reference point S to the load application point P is defined as $L_{load}$ (70 mm).

The relationship between the length dimension of $L_{insert}$ and the size of the radius of curvature R is given below for each sample for which simulation analysis is performed.

First sample (A1): $L_{insert}$: 10 mm, R: 10 mm
Second sample (A2): $L_{insert}$: 20 mm, R: 10 mm
Third sample (A3): $L_{insert}$: 40 mm, R: 10 mm
Fourth sample (A4): $L_{insert}$: 60 mm, R: 10 mm
Fifth sample (A5): $L_{insert}$: 20 mm, R: 5 mm
Sixth sample (A6): $L_{insert}$: 40 mm, R: 5 mm
Seventh sample (A1): $L_{insert}$: 20 mm, R: 20 mm
Eighth sample (A8): $L_{insert}$: 40 mm, R: 20 mm Moreover, in this example, in addition to the eight samples in which the reinforcing member 52 is inserted, simulation analysis is also performed for a comparative sample (B) that includes only the front-side housing 15a that is a resin part and in which the reinforcing member 52 is not inserted. Note that in the comparative sample (B), the size of the radius of curvature of the corner portion 51 is set to 10 mm.

[Simulation Analysis Result]

As a result of the simulation analysis under conditions such as described above, it is confirmed that the maximum principal stress at the joining boundary portion X of the front-side housing 15a decreases as the front-rear dimension L ($L_{insert}$) of the reinforcing member 52 increases.

Figure 12:
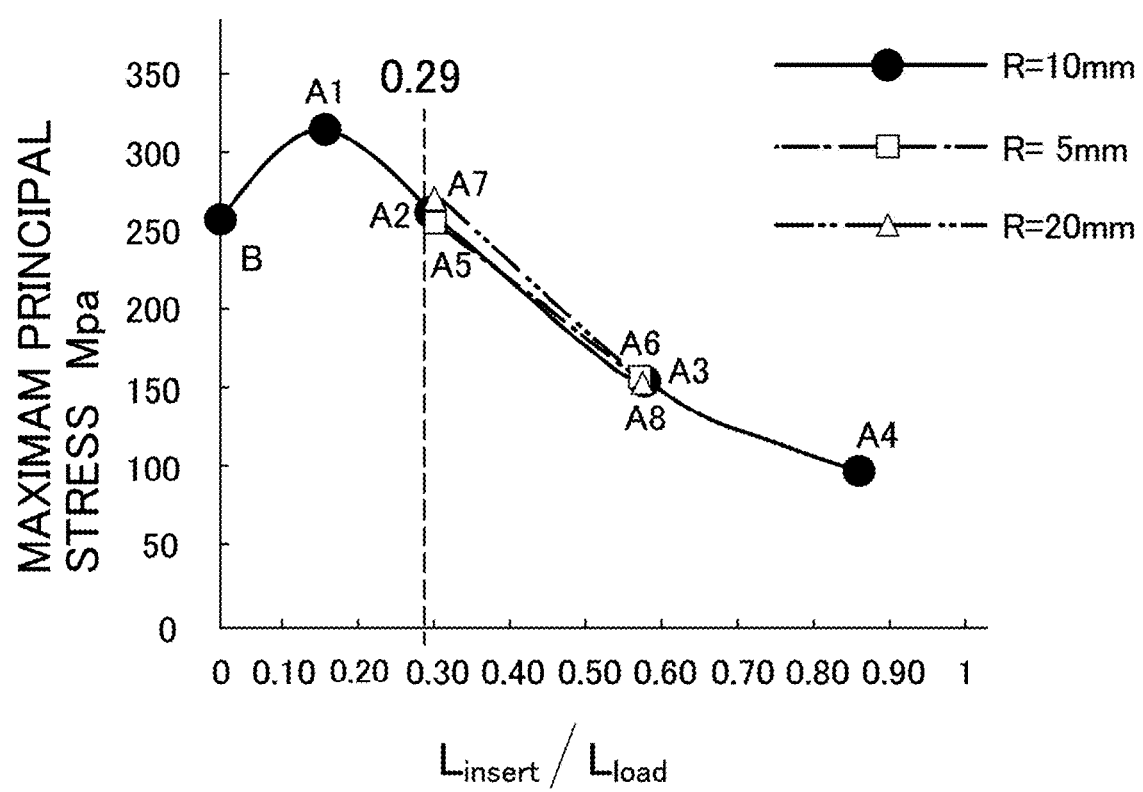
FIG. 12 is a graph illustrating the results of the simulation analysis in the second example.

FIG. 12 illustrates the relationship obtained by simulation analysis between the value ($L_{insert}/L_{load}$) provided by dividing the length dimension $L_{insert}$ from the reference point S to the front-end portion of the support portion reinforcing portion 65 by the length dimension $L_{load}$ from the reference point S to the load application point P and the value of the maximum principal stress. The symbols attached to the vicinity of each plot point in FIG. 12 are symbols representing the 1st sample (A1) to the 8th sample (A8) and the comparative sample (B). As apparent from the graph of FIG. 12, between samples having the same radius of curvature R {between the first sample (A1) and the fourth sample (A4), between the fifth sample (A5) and the sixth sample (A6), and between the seventh sample (A7) and the eighth sample (A8)}, it is confirmed that as the front-rear dimension L ($L_{insert}$) of the reinforcing member 52 increases, the value of the maximum principal stress acting on the joining boundary portion X of the front-side housing 15a decreases.

Note that in this example, it is confirmed that as the front-rear dimension of the reinforcing member 52 (the length dimension of the support portion reinforcing portion 65) is increased, the value of the maximum principal stress acting on the joining boundary portion X of the front-side housing 15a is reduced; however, similarly, it is estimated that as the vertical dimension of the reinforcing member 52 (the length dimension of the front plate reinforcing portion 64) is increased, the value of the maximum principal stress acting on the joining boundary portion of the front-side housing 15a that is joined to the lower end portion of the front plate reinforcing portion 64 is decreased.

On the other hand, of the samples having the same front-rear dimension L ($L_{insert}$) of the reinforcing member 52 {among the second sample (A2), the fifth sample (A5), and the seventh sample (A7), and among the third sample (A3), the sixth sample (A6), and the eighth sample (A8)}, even when the radius of curvature R greatly changes, the value of the maximum principal stress acting on the joining boundary portion X of the front-side housing 15a is confirmed to be mostly unchanged. In other words, it is confirmed that the size of the radius of curvature R hardly affects the maximum principal stress at the joining boundary portion X.

Furthermore, in comparing with the comparative sample (B) in which the reinforcing member 52 is not inserted, it is confirmed that even when the reinforcing member 52 is inserted, unless the front-rear dimension L ($L_{insert}$) of the reinforcing member 52 is increased to some extent, the value of the maximum principal stress acting on the joining boundary portion X of the front-side housing 15a (for example, the value of the maximum principal stress in the first sample (A1)) is higher than that of the comparative sample (B) in which the reinforcing member 52 is not inserted. More specifically, by setting the front-rear dimension L of the reinforcing member 52 so that the value of $L_{insert}/L_{load}$ is greater than 0.29, it is confirmed that the value of the maximum principal stress acting on the joining boundary portion X of the front-side housing 15a may be made lower than that in the comparative sample (B) in which the reinforcing member 52 is not inserted.

Third Example

Figure 13:
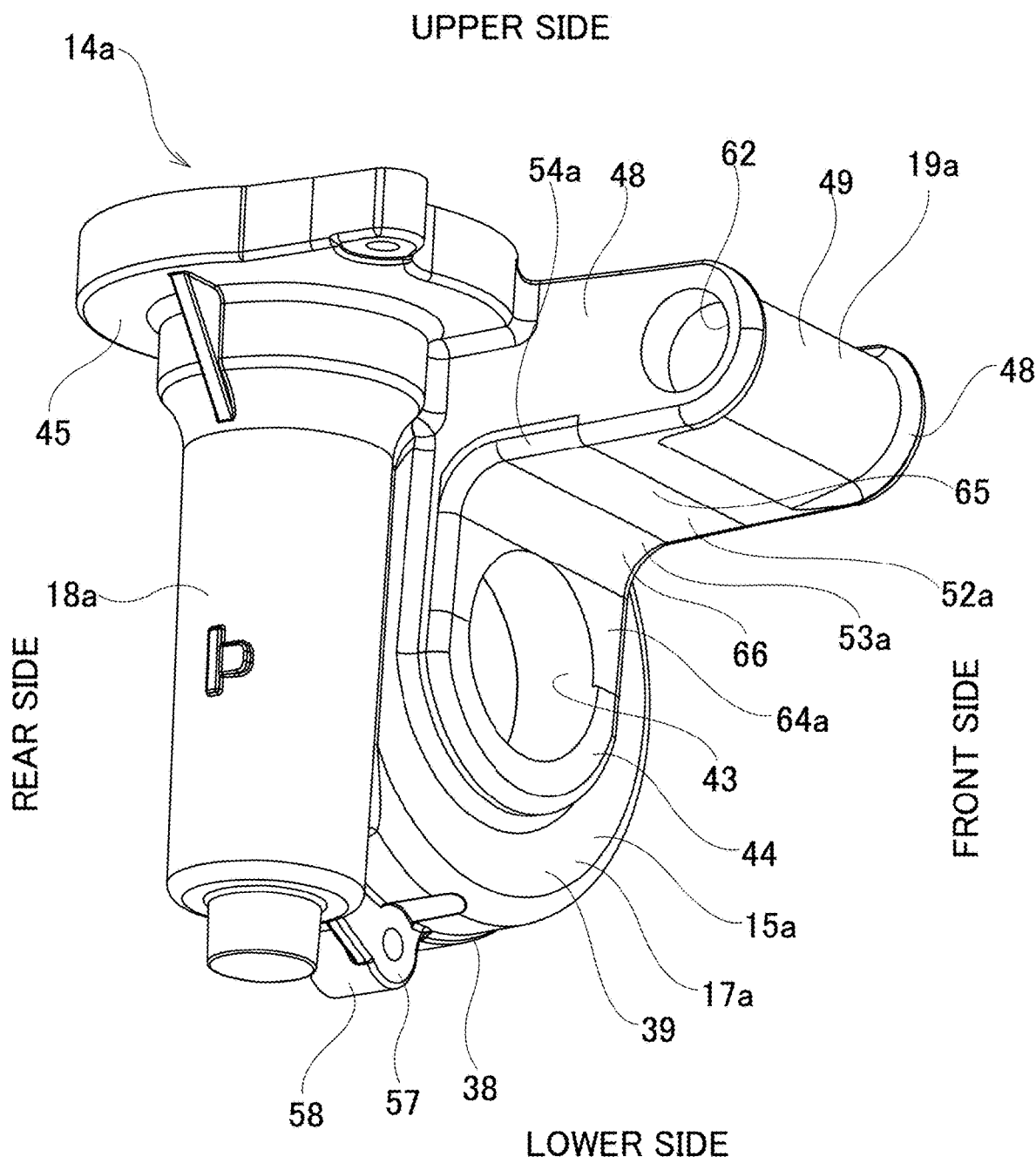
FIG. 13 is a view corresponding to FIG. 5 and illustrates a gear housing of a third example of the embodiment.
Figure 14:
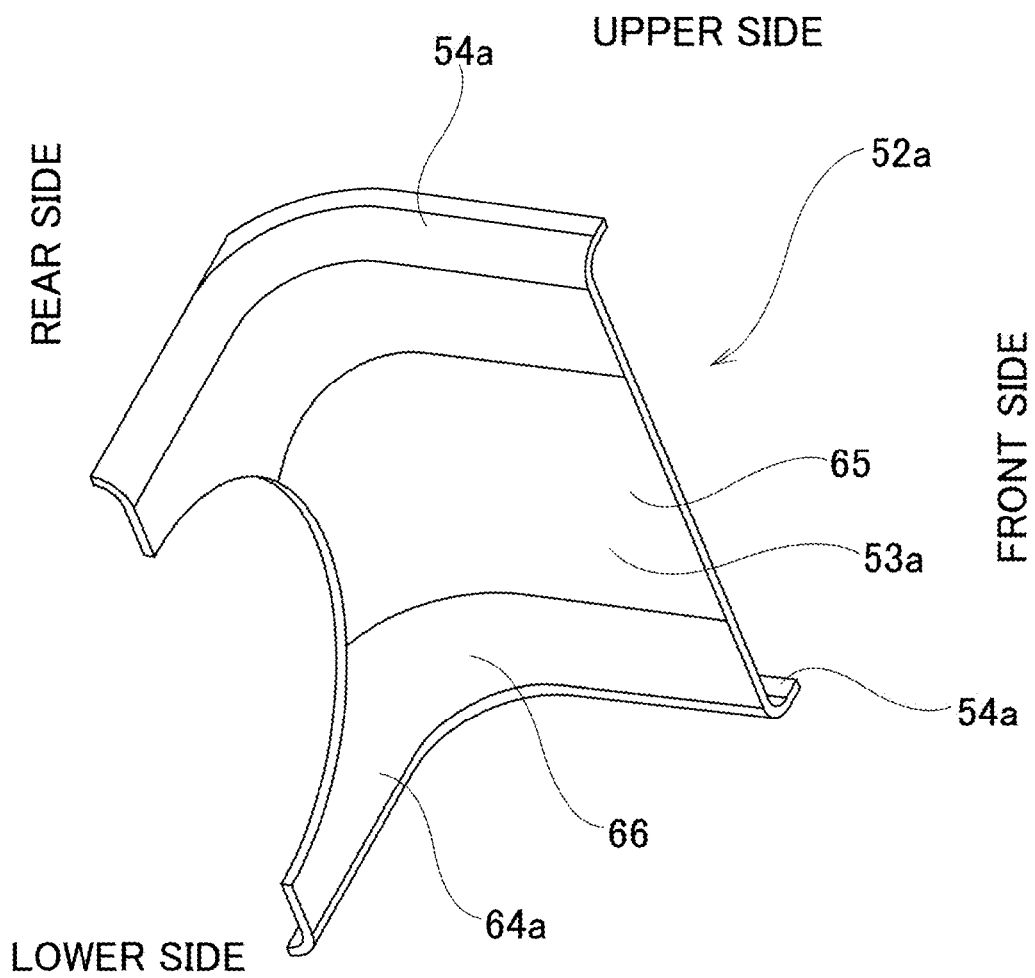
FIG. 14 is a perspective view of a reinforcing member removed from the gear housing of the third example as seen from the front and below.
Figure 15:
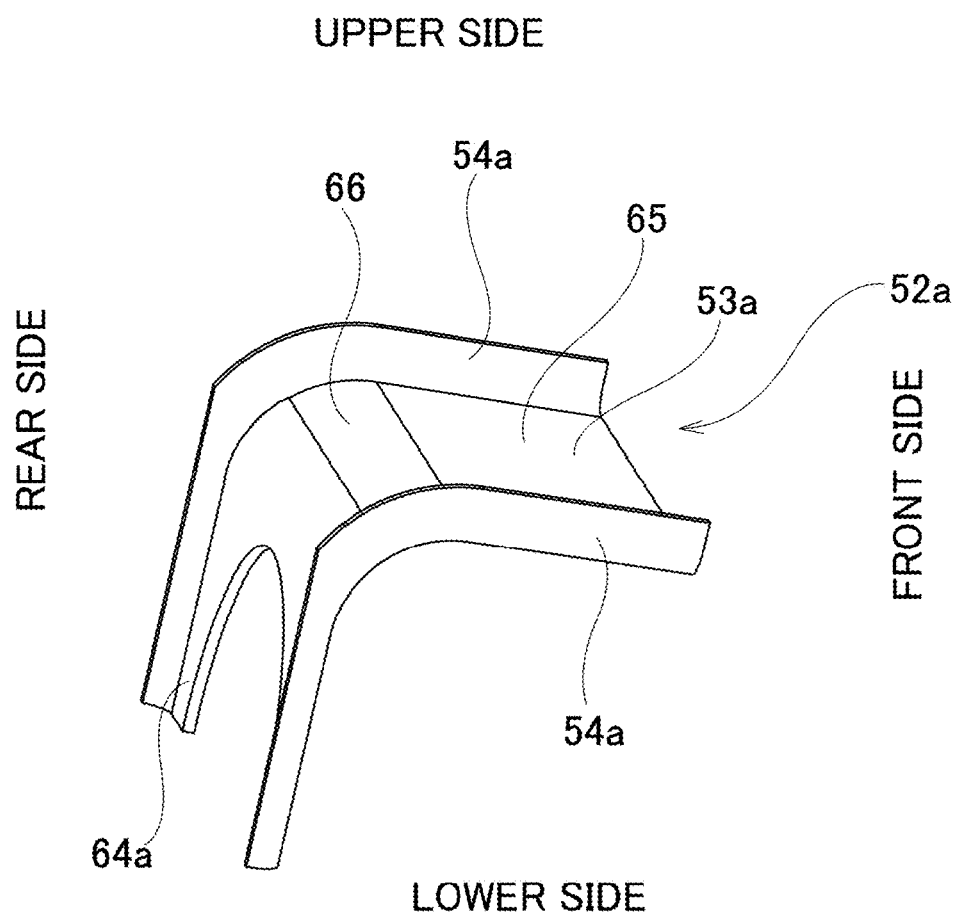
FIG. 15 is a perspective view of the reinforcing member of the third example as seen from one side in the width direction and above.
Figure 16:
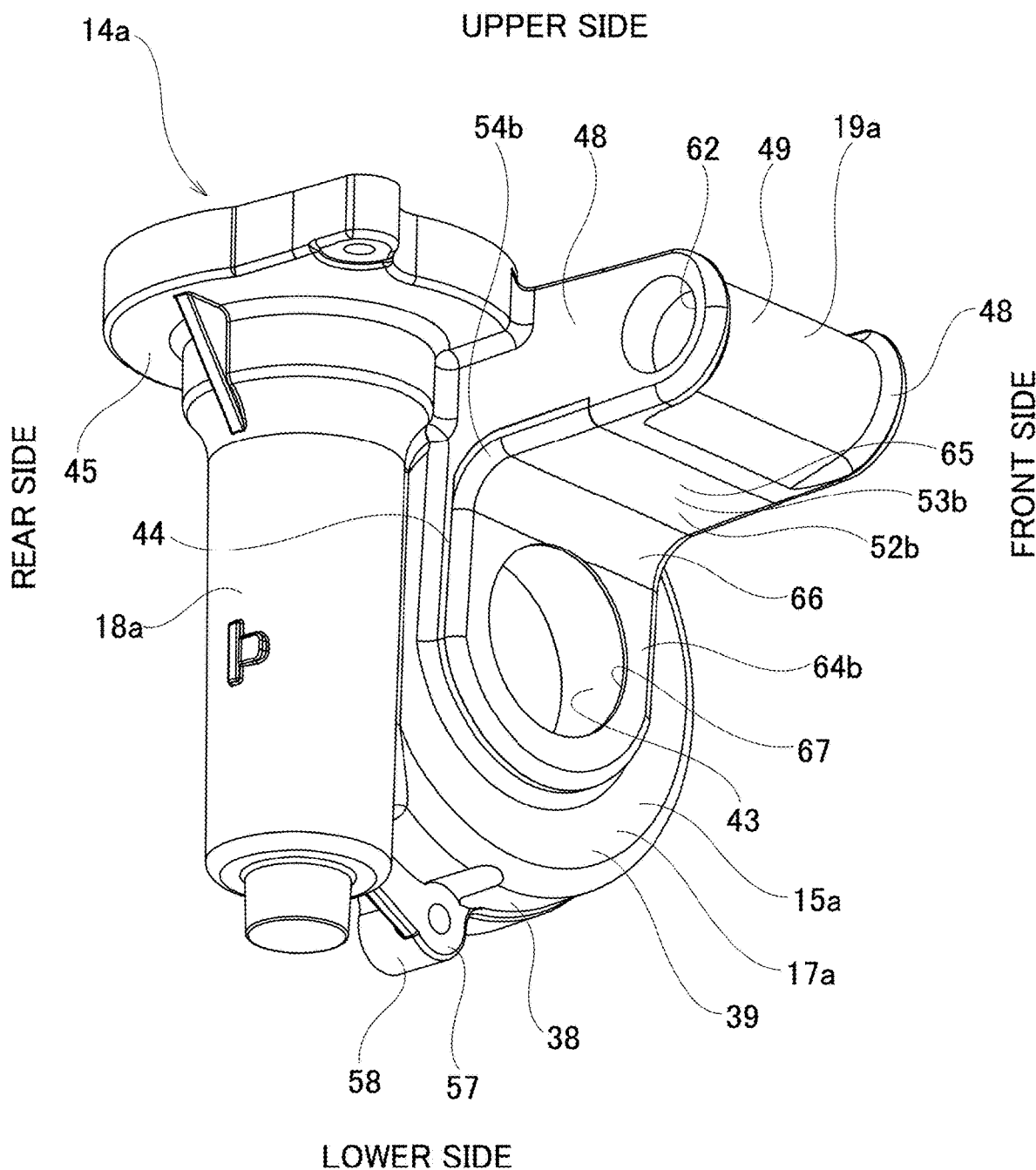
FIG. 16 is a view corresponding to FIG. 5 and illustrates a gear housing of a fourth example of the embodiment.
Figure 17:
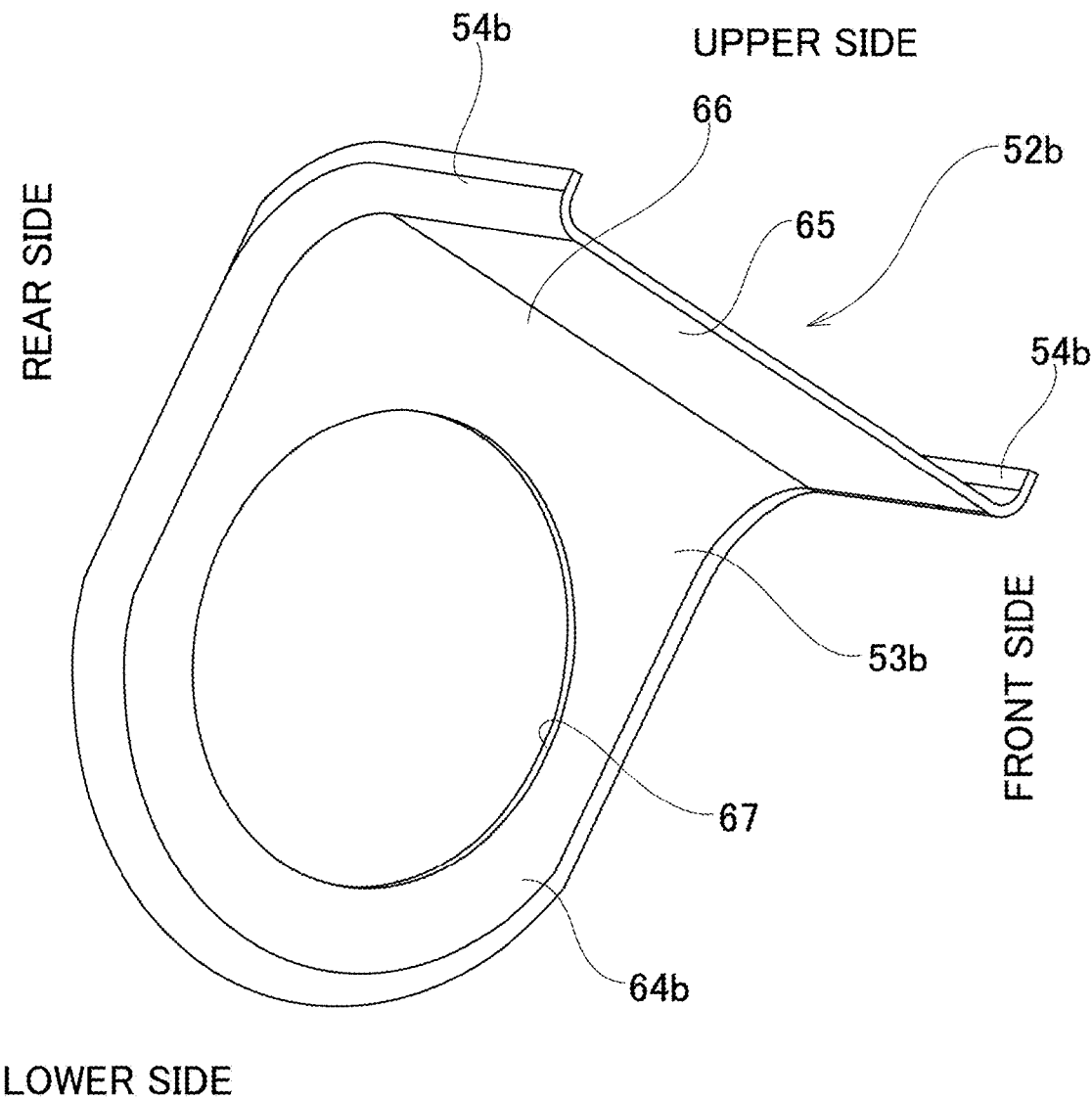
FIG. 17 is a view corresponding to FIG. 14 and illustrates a reinforcing member of the fourth example.
Figure 18:
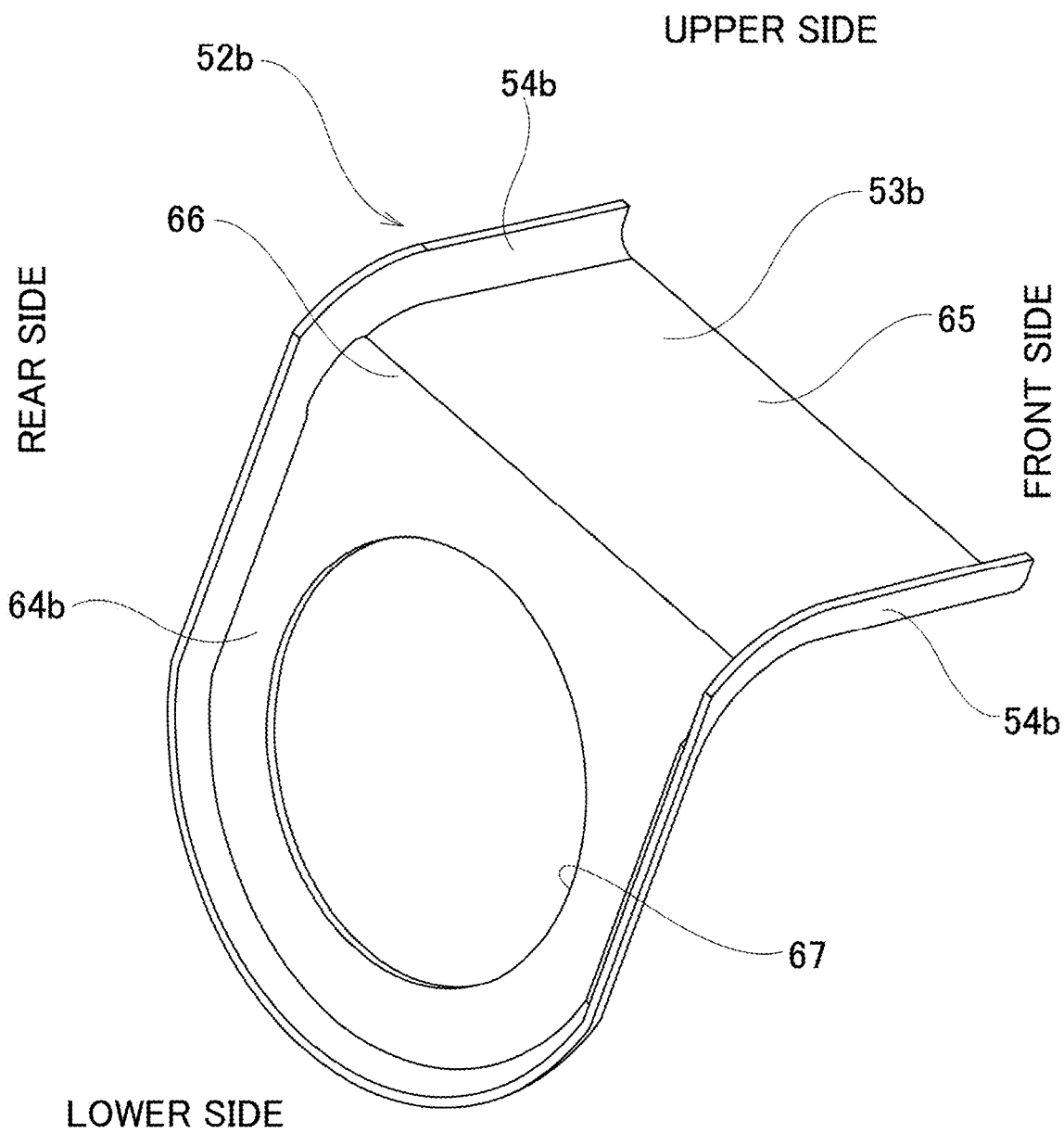
FIG. 18 is a perspective view of the reinforcing member of the fourth example as seen from the rear and above.
Figure 19:
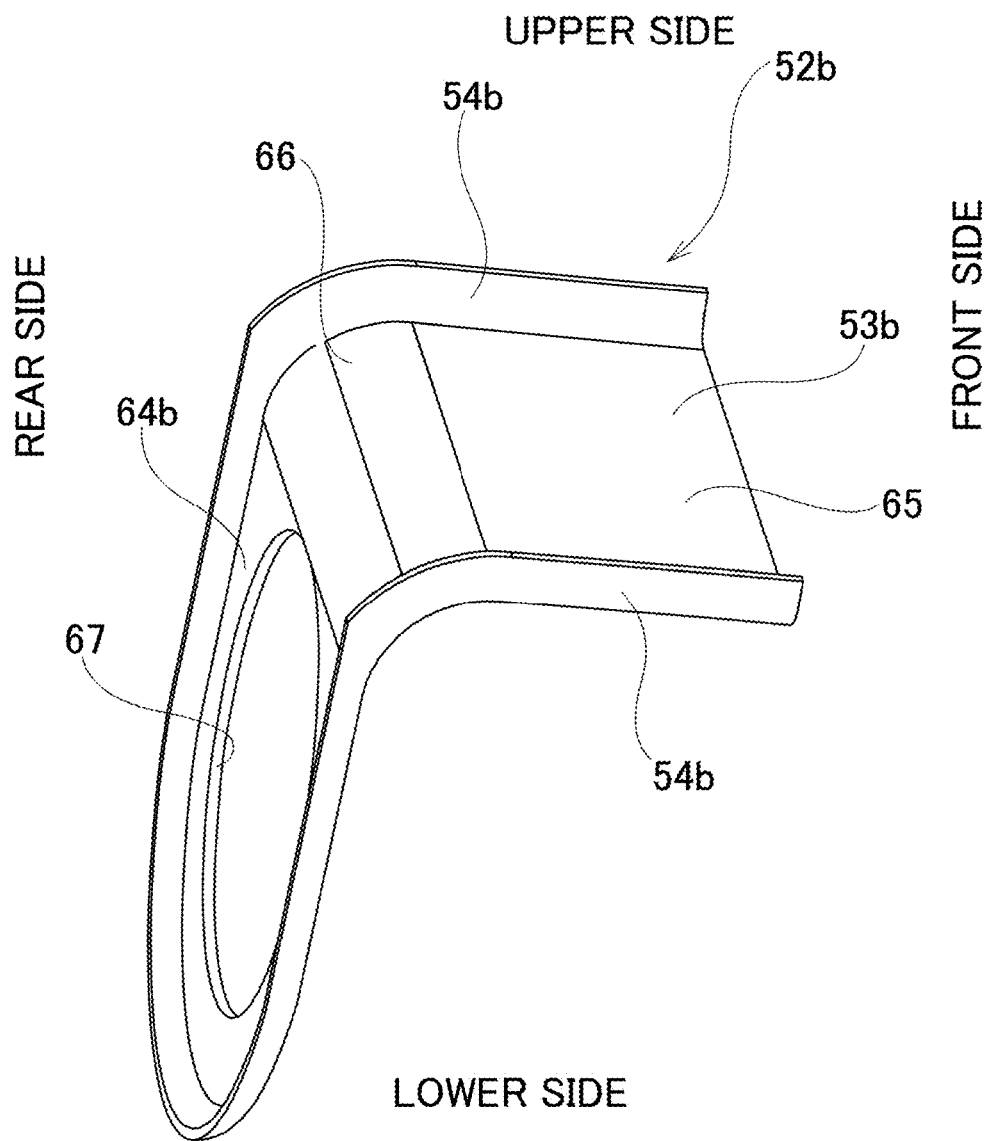
FIG. 19 is a view corresponding to FIG. 15 and illustrates the reinforcing member of the fourth example.

The third example of an embodiment of the present invention will be described with reference to FIG. 13 to FIG. 15.

In this example, the structure of the reinforcing member 52a is different from that of the first example. In other words, the reinforcing member 52a of this example has a configuration in which the front plate reinforcing portion 64a extends downward more than in the structure of the first example. The front plate reinforcing portion 64a has a substantially C-shape with an intermediate portion in the width direction recessed toward the upper side, and not only covers the upper end portion of the front surface of the protruding portion 44, covers also the portions of the front surface of the protruding portion 44 that exist on both sides in the width direction of the upper half portion of the bearing holding hole 43. Moreover, a pair of bent portions 54a of the reinforcing member 52a covers the lower end portion of half of the base portion (rear half portion) of the support portion 19a and the upper half portion of the protruding portion 44 from both sides in the width direction.

In this example having a configuration such as described above, the length dimension (vertical dimension) of the front plate reinforcing portion 64a of the main body plate portion 53a is made longer than the structure of the first example, so of the protruding portion 44 of the front-side housing 15a, the stress acting on the joining boundary portion, which is the portion joined to the tip-end portion (lower end portion) of the front plate reinforcing portion 64a, can be kept low.

The other configuration and functional effects are the same as in the first example.

Fourth Example

The fourth example of an embodiment of the present invention will be described with reference to FIG. 16 to FIG. 19.

In this example, the structure of the reinforcing member 52b is different from those in the first and third examples. In other words, the reinforcing member 52b of this example has a configuration in which the front plate reinforcing portion 64b extends downward more than in the structure of the third example. The front plate reinforcing portion 64b has a substantially O shape having a circular hole 67 in the center portion, and covers the entire front surface of the protruding portion 44. In other words, of the front surface of the protruding portion 44, the entire circumference surrounding the bearing holding hole 43 is covered. In addition, the pair of bent portions 54b of the reinforcing member 52b is connected to each other at the lower end portion of the front plate reinforcing portion 64b, and together with covering the lower end portion of half of the base (rear half portion) of the support portion 19a from both sides in the width direction, covers around the protruding portion 44 (except the upper edge).

In this example having a configuration such as described above, the length dimension (vertical dimension) of the front plate reinforcing portion 64b of the main body plate portion 53b is made to be longer than in the structure of the third example, so of the protruding portion 44 of the front-side housing 15a, the stress acting on the joining boundary portion, which is the portion joined to the tip-end portion (lower end portion) of the front plate reinforcing portion 64b, can be kept low.

The other configuration and functional effects are the same as in the first and third examples.

Fifth Example

Figure 20:
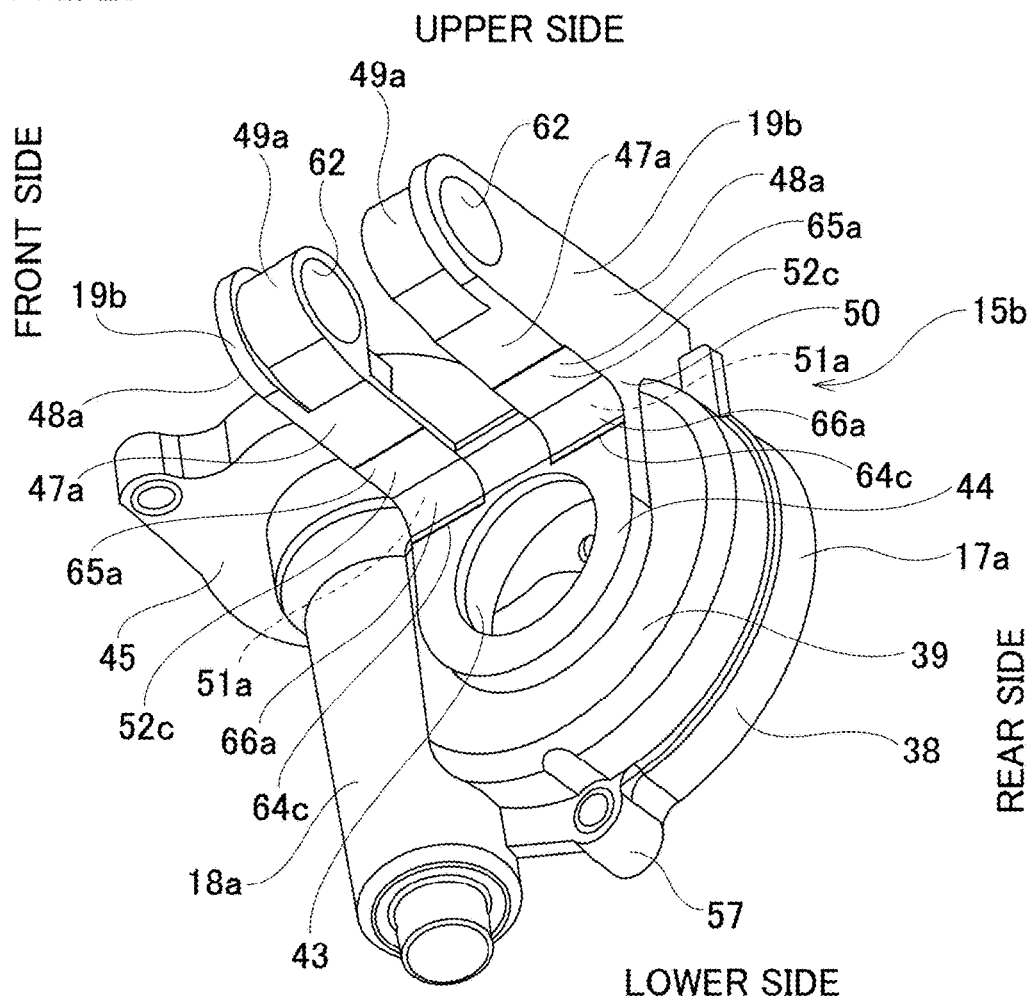
FIG. 20 is a perspective view illustrating a front-side housing of a gear housing of a fifth example of the embodiment.
Figure 21:
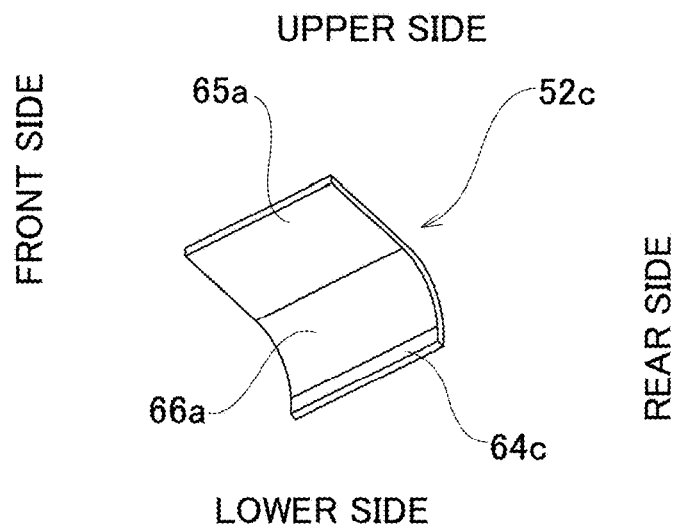
FIG. 21 is a perspective view illustrating a reinforcing member removed front-side housing of the fifth example.

The fifth example of an embodiment of the present invention will be described using FIG. 20 and FIG. 21.

The front-side housing 15b of this example is provided with a pair of support portions 19b at the upper end portion of the front surface of the housing front plate portion 39 in a state of being separated in the width direction. Therefore, the pair of support portions 19b has a configuration in which the support portion 19a of the first example described above is divided into two in the width direction. Each support portion 19b of the pair includes a protruding plate portion 47a, one side plate portion 48a, and a support cylinder portion 49a having a support hole 62.

In the case of this example, reinforcing members 52c made of a metal plate are provided in a pair of corner portions 51a existing between the front surface of the protruding portion 44 provided on the housing front plate portion 39 and the lower surfaces of the protruding plate portions 47a of the support portions 19b. Each reinforcing member 52c is bent at a substantially right angle along the corner portion 51a, and includes a front plate reinforcing portion 64c covering the upper end portion of the front surface of the protruding portion 44, a support portion reinforcing portion 65a covering the base end portion of the lower surface of the protruding plate portion 47a over the entire width, and a curved portion 66a curved in a circular arc shape that smoothly connects the upper end portion of the front plate reinforcing portion 64c and the rear-end portion of the support portion reinforcing portion 65a.

In this example having a configuration such as described above, a gap is provided between the pair of support portions 19b, so the weight can be further reduced as compared with the first example. In addition, together with being able to increase the strength of each of the continuous portions 50 between the housing front plate portion 39 and the pair of support portions 19b, it is possible to prevent the corner portions 51a from being damaged.

The other configuration and functional effects are the same as in the first example.

Sixth Example

Figure 22:
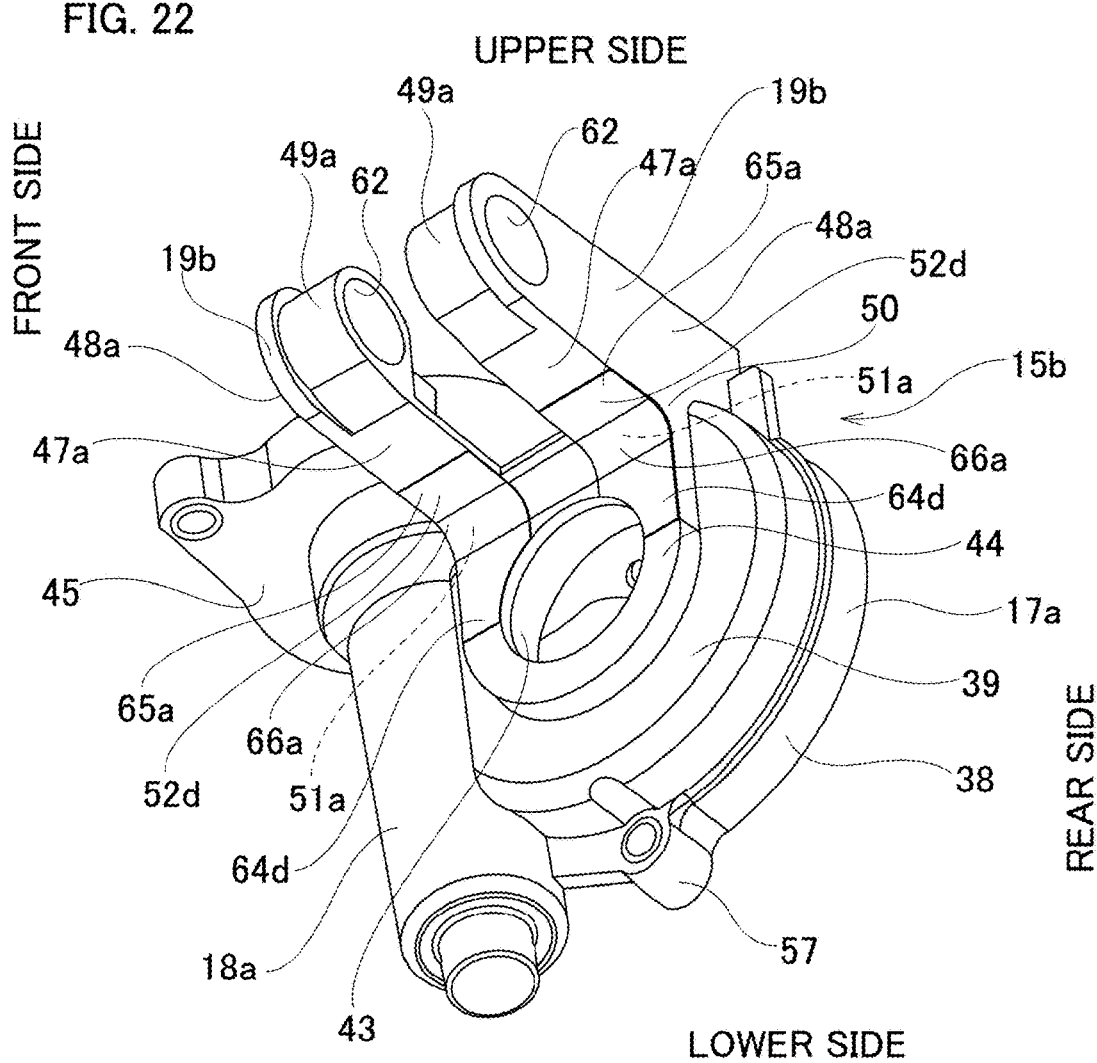
FIG. 22 is a view corresponding to FIG. 20 and illustrates a front-side housing of a sixth example of the embodiment.
Figure 23:
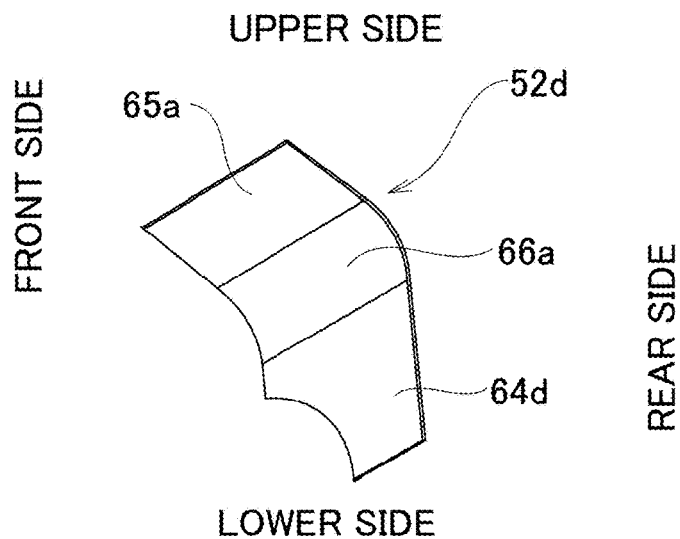
FIG. 23 is a view corresponding to FIG. 21 and illustrates a reinforcing member of the sixth example.

The sixth example of an embodiment of the present invention will be described using FIG. 22 and FIG. 23.

In this example, the structure of the pair of reinforcing members 52d is different from that of the fifth example. In other words, the reinforcing members 52d of this example have a configuration in which the front plate reinforcing portion 64*d* extends downward more than in the structure of the fifth example. The front plate reinforcing portions 64*d* not only cover the upper end portion of the front surface of the protruding portion 44 but also cover portions of the front surfaces of the protruding portion 44 that are present on the sides in the width direction of the upper half portion of the bearing holding hole 43.

In this example having a configuration such as described above, the length dimension (vertical dimension) of the front plate reinforcing portions 64*d* is longer than that in the structure of the fifth example, so of the protruding portion 44 of the front-side housing 15*b*, the stress acting on the joining boundary portions, which are the portions joined to the tip end portions (lower end portions) of the front plate reinforcing portions 64*d*, can be kept low.

The other configuration and functional effects are the same as in the first and fifth examples.

Seventh Example

Figure 24:
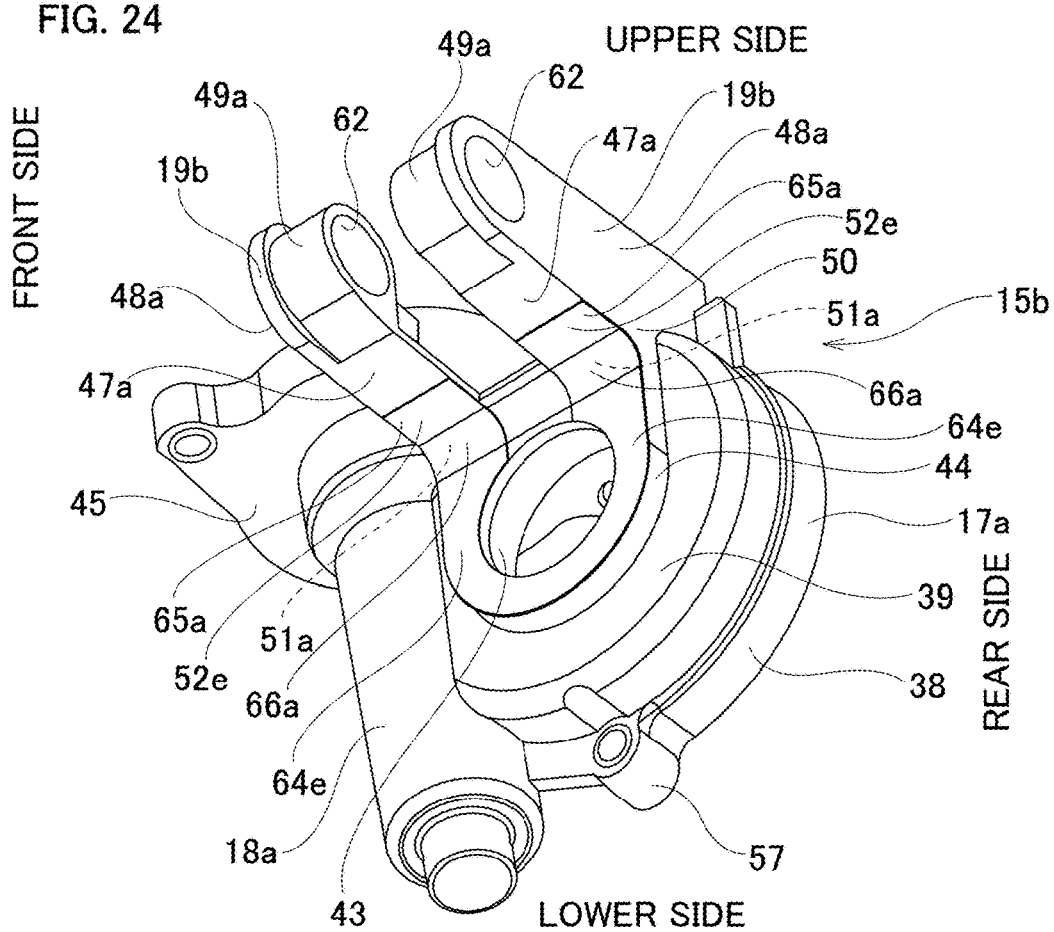
FIG. 24 is a view corresponding to FIG. 20 and illustrates a front-side housing of a seventh example of the embodiment.
Figure 25:
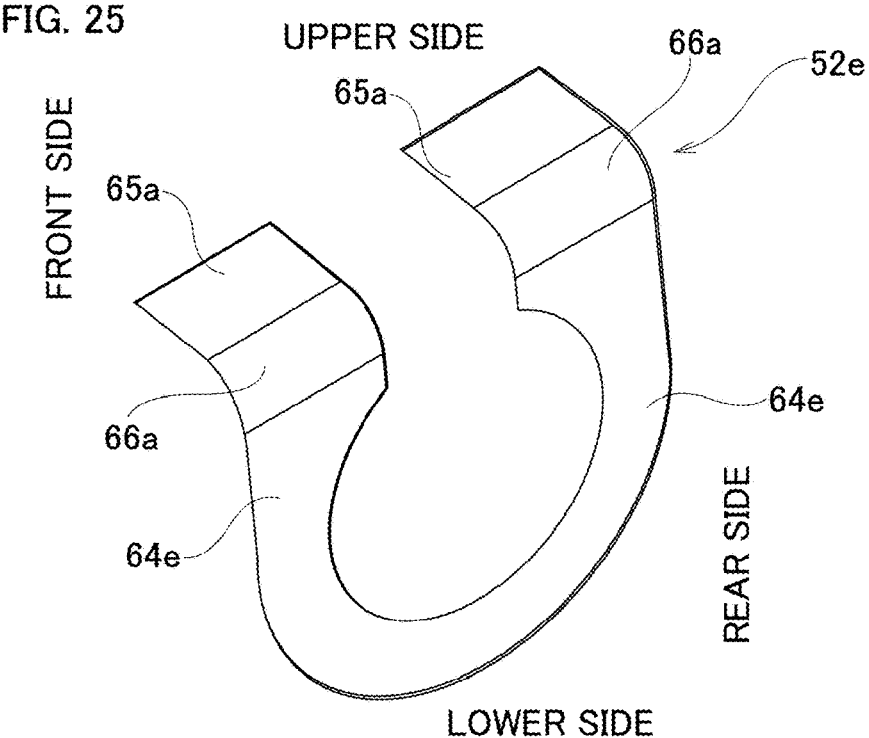
FIG. 25 is a view corresponding to FIG. 21 and illustrates a reinforcing member of the seventh example.

The seventh example of an embodiment of the present invention will be described using FIG. 24 and FIG. 25.

The reinforcing member 52*e* used in this example has a configuration in which the pair of reinforcing members 52*d* used in the fifth example is connected in the width direction. In other words, in the reinforcing member 52*e* of this example, the front plate reinforcing portions 64*e* extend downward more than in the structure of the sixth example, and the front end portions (lower end portions) of the front plate reinforcing portions 64*e* are connected together. As a result, the pair of front plate reinforcing portions 64*e* has a substantially C shape as a whole, and cover a large portion (portion excluding the intermediate portion in the width direction of the upper end portion) of the front surface of the protruding portion 44.

In this example having a configuration such as described above, the length dimension (vertical dimension) of the front plate reinforcing portions 64*e* is longer than that in the structure of the sixth example, so of the protruding portion 44 of the front-side housing 15*b*, the stress acting on the joining boundary portions, which are the portions joined to the tip end portions (lower end portions) of the front plate reinforcing portions 64*e*, can be kept low. In addition, in comparison with the fifth example, the number of parts can be reduced, and thus the manufacturing cost of the gear housing 14*a* can be reduced. Moreover, the two support portions 19*b* are reinforced by the single reinforcing member 52*e*, so twisting of the support portion 19*b* may be effectively prevented.

The other configuration and functional effects are the same as in the first and fifth examples.

Eighth Example

Figure 26:
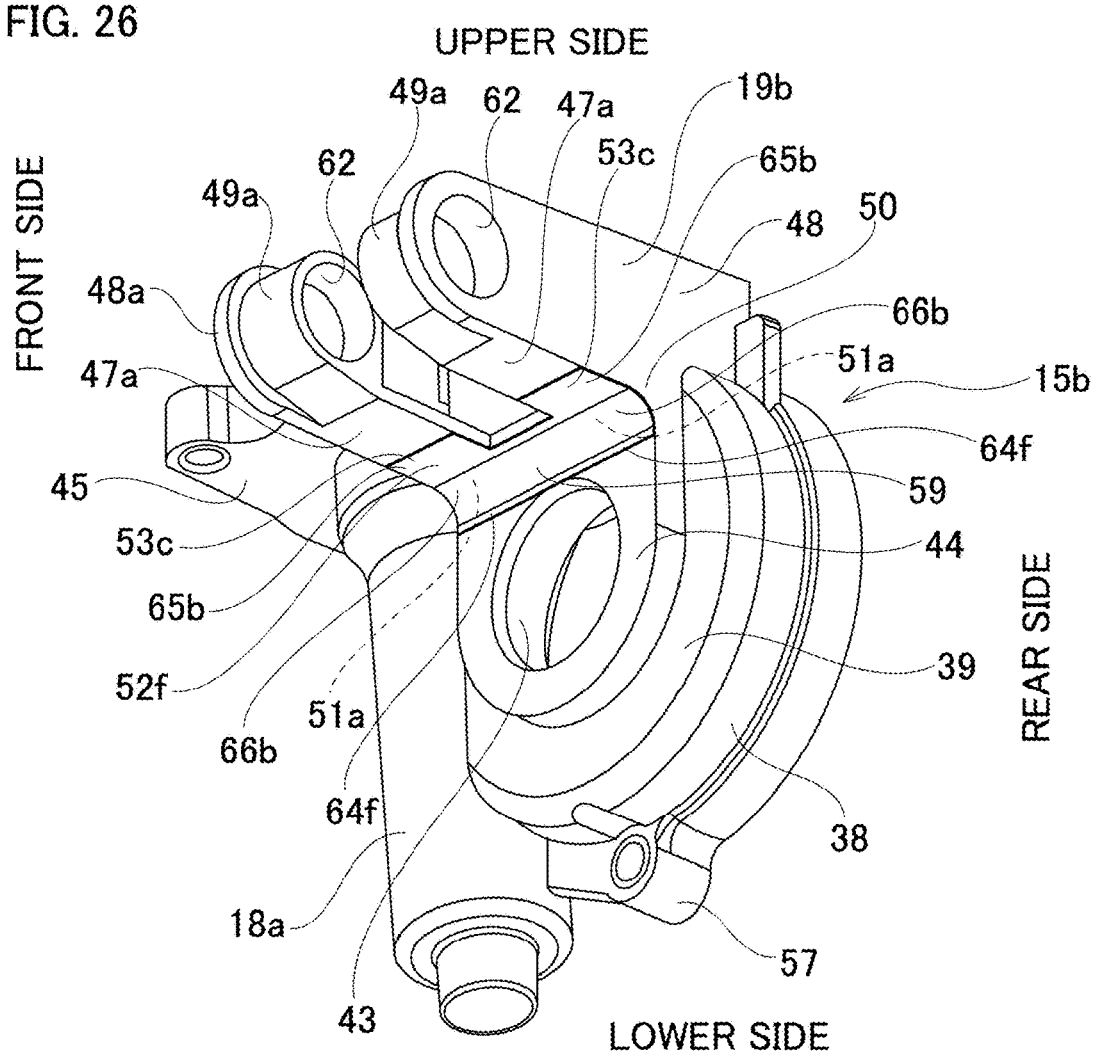
FIG. 26 is a view corresponding to FIG. 20 and illustrates a front-side housing of an eighth example of the embodiment.
Figure 27:
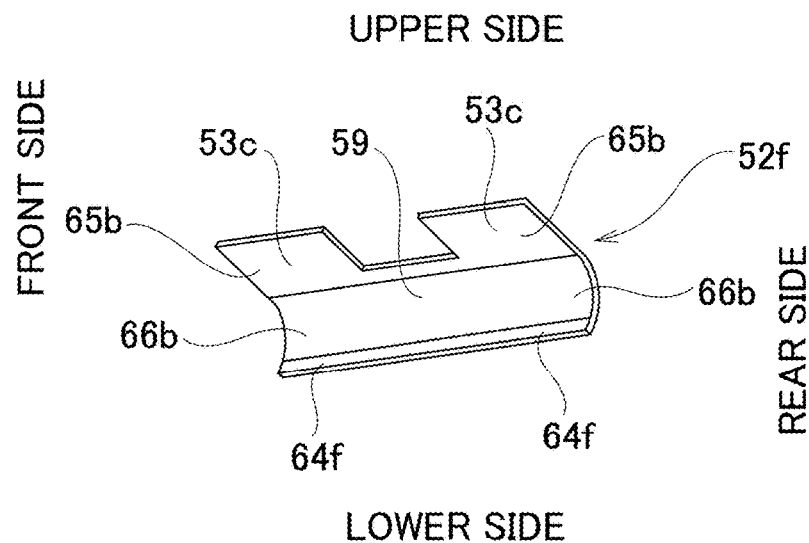
FIG. 27 is a view corresponding to FIG. 21 and illustrates a reinforcing member of the eighth example.

The eighth example of an embodiment of the present invention will be described using FIG. 26 and FIG. 27.

In this example, a reinforcing member 52*f* different from the fifth to seventh examples is combined with the front-side housing 15*b* having the same configuration as the fifth to seventh examples described above. In other words, the reinforcing member 52*f* of this example has a configuration in which the pair of reinforcing members 52*c* used in the fifth example is connected in the width direction, and has a pair of main body plate portions 53*c* and a connecting plate portion 59. Each of the pair of main body plate portions 53*c* is bent at a substantially right angle along the corner portion 51*a*, and has front plate reinforcing portions 64*f* that cover both side portions in the width direction of the upper end portion of the front surface of the protruding portion 44, support portion reinforcing portions 65*b* that cover the base end portion of the lower surface of the protruding plate portions 47*a* over the entire width, and curved portions 66*b* connecting the upper end portion of front plate reinforcing portions 64*f* and the rear-end portion of support portion reinforcing portions 65*b*. The connecting plate portion 59 is provided between the pair of main body plate portions 53*c*, and connects the pair of main body plate portions 53*a* in the width direction.

In this example having a configuration as described above, the number of parts can be reduced as compared with the case of the fifth example, and thus the manufacturing cost of the gear housing 14*a* can be reduced. Moreover, the two support portions 19*b* are reinforced by the single reinforcing member 52*f*, so twisting of the support portion 19*b* may be effectively prevented.

The other configuration and functional effects are the same as in the first and fifth examples.

Ninth Example

Figure 28:
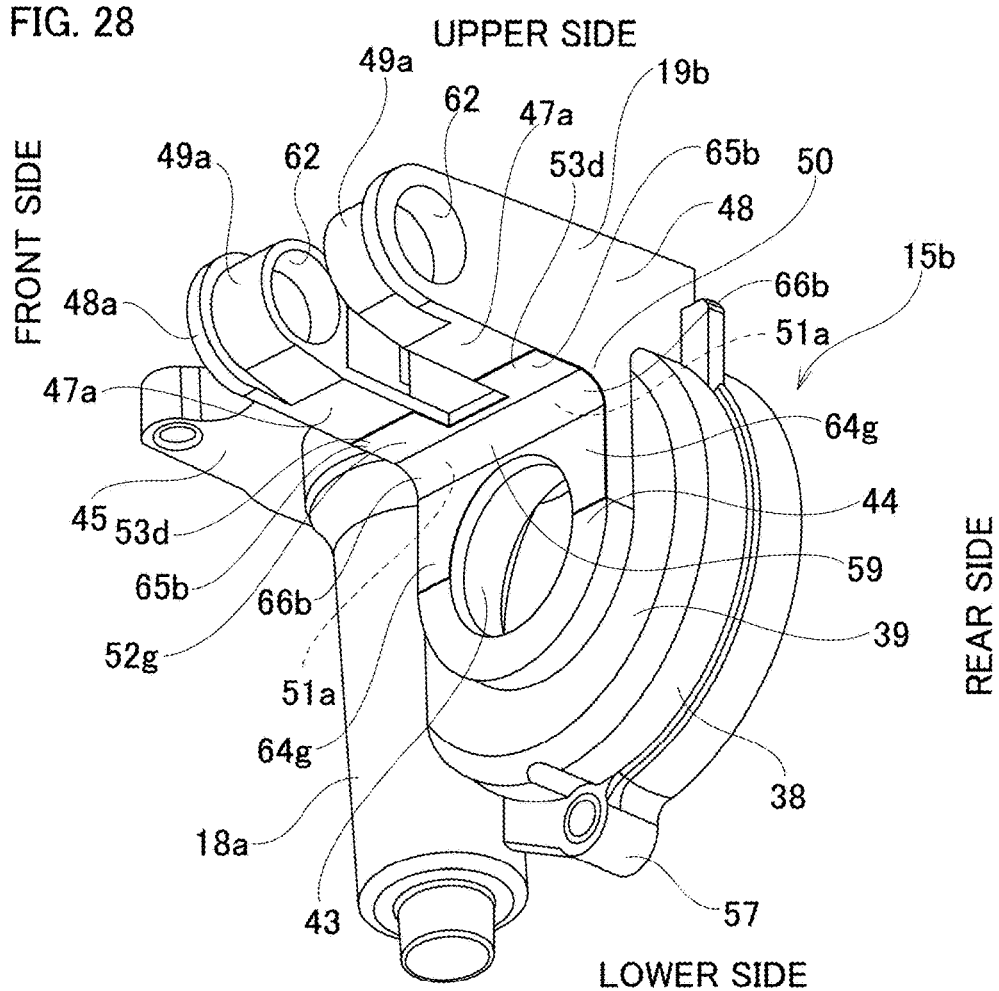
FIG. 28 is a view corresponding to FIG. 20 and illustrates a ninth example of an embodiment.
Figure 29:
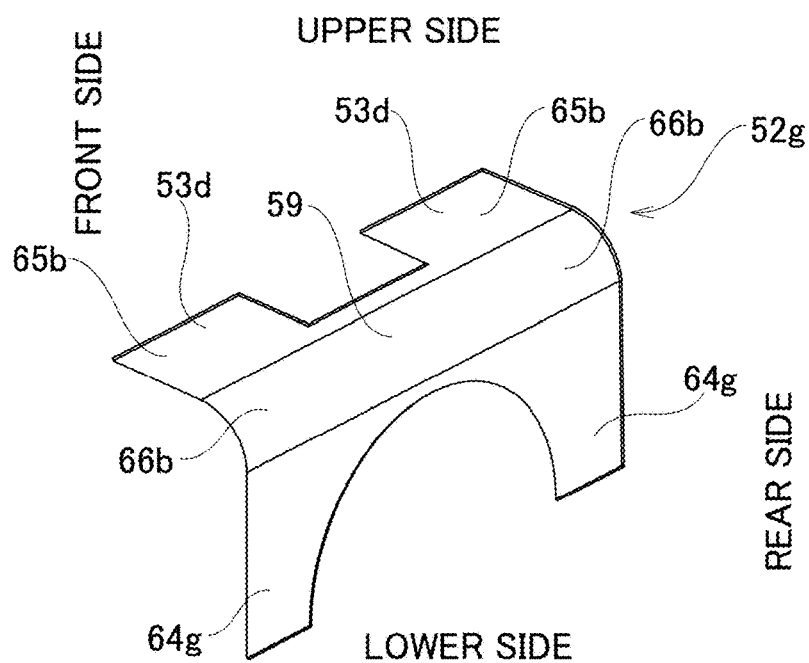
FIG. 29 is a view corresponding to FIG. 21 and illustrates the ninth example of an embodiment.

The ninth example of an embodiment of the present invention will be described using FIG. 28 and FIG. 29.

In this example, the structure of the reinforcing member 52*g* is different from that of the eighth example. In other words, the reinforcing member 52*g* of this example has a configuration in which the front plate reinforcing portions 64*g* extend downward more than in the structure of the eighth example. The front plate reinforcing portions 64*g* not only cover both side portions in the width direction of the upper end portion of the front surface of the protruding portion 44, but also cover the portions on both sides in the width direction of the upper half portion of the bearing holding hole 43 of the front surface of the protruding portion 44.

In this example having a configuration such as described above, the length dimension (vertical dimension) of the front plate reinforcing portions 64*g* of the main body plate portion 53*d* is made to be longer than in the structure of the eighth example, so of the protruding portion 44 of the front-side housing 15*b*, the stress acting on the joining boundary portions, which are the portions joined to the tip-end portions (lower end portions) of the front plate reinforcing portions 64*g*, can be kept low.

The other configuration and functional effects are the same as in the first and eighth examples.

Tenth Example

Figure 30:
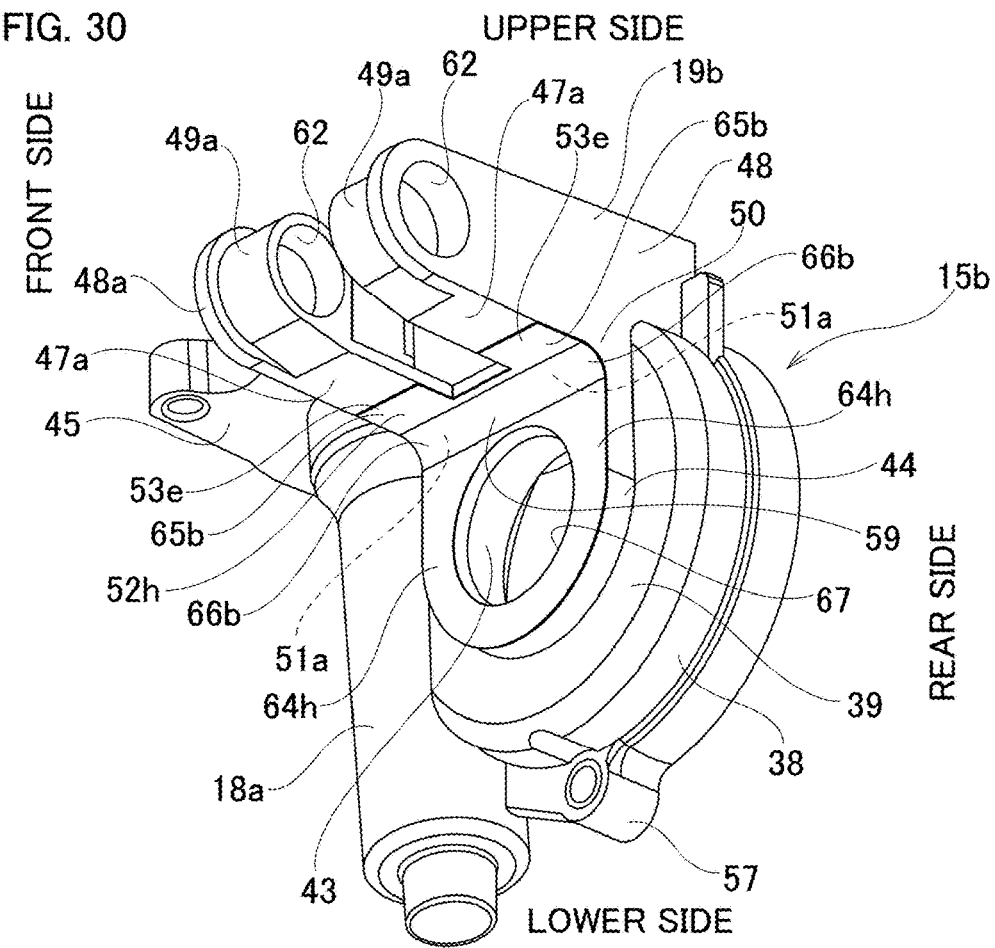
FIG. 30 is a view corresponding to FIG. 20 and illustrates a front-side housing of a tenth example of the embodiment.
Figure 31:
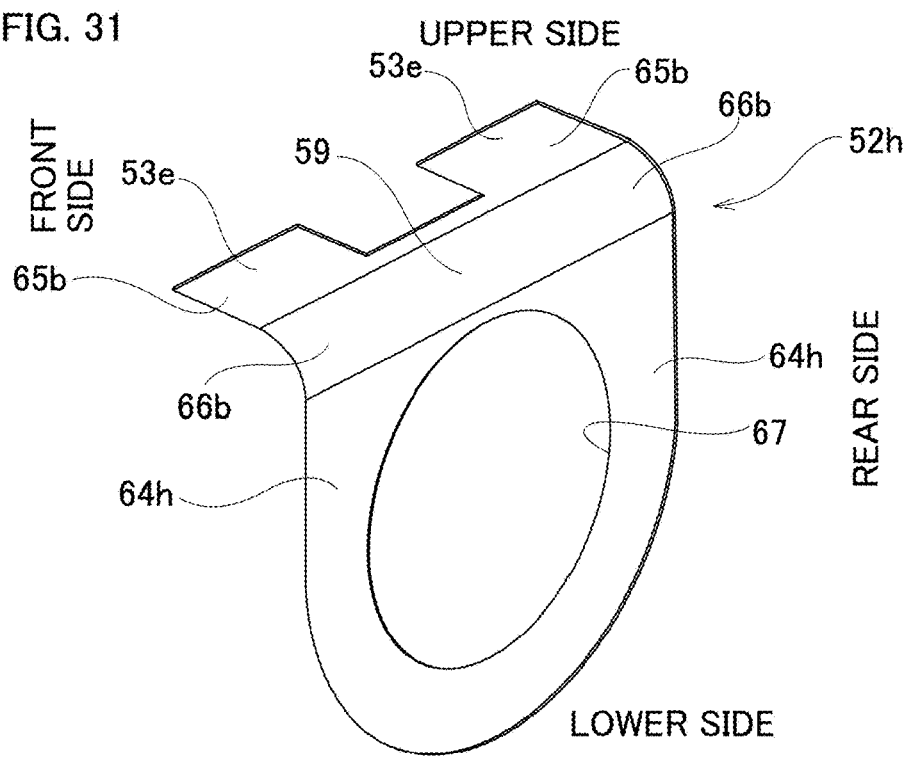
FIG. 31 is a view corresponding to FIG. 21 and illustrates a reinforcing member of the tenth example.

The tenth example of an embodiment of the present invention will be described using FIG. 30 and FIG. 31.

In the reinforcing member 52*h* used in this example, the front plate reinforcing portions 64*h* extend downward more than in the structure of the ninth example, and the tip-end portions (lower end portions) of the front plate reinforcing portions 64*h* are connected to each other. As a result, each of the pair of front plate reinforcing portions 64*h* is substantially C-shaped as a whole, forming a circular hole 67 in the center portion. In addition, the pair of front plate reinforcing portions 64*h* covers a large portion of the front surface of the protruding portion 44 (a portion excluding the intermediate portion in the width direction of the upper end portion). Note that in this example, the intermediate portion in the width direction of the upper end portion of the front surface of the protruding portion 44 is covered with the connecting plate portion 59.

In this example having a configuration such as described above, the length dimension (vertical dimension) of the front plate reinforcing portions 64n of the main body plate portion 53b is made to be longer than in the structure of the ninth example, so of the protruding portion 44 of the front-side housing 15b, the stress acting on the joining boundary portions, which are the portions joined to the tip-end portions (lower end portions) of the front plate reinforcing portions 64h, can be kept low.

The other configuration and functional effects are the same as in the first and eighth examples.

Eleventh Example

Figure 32:
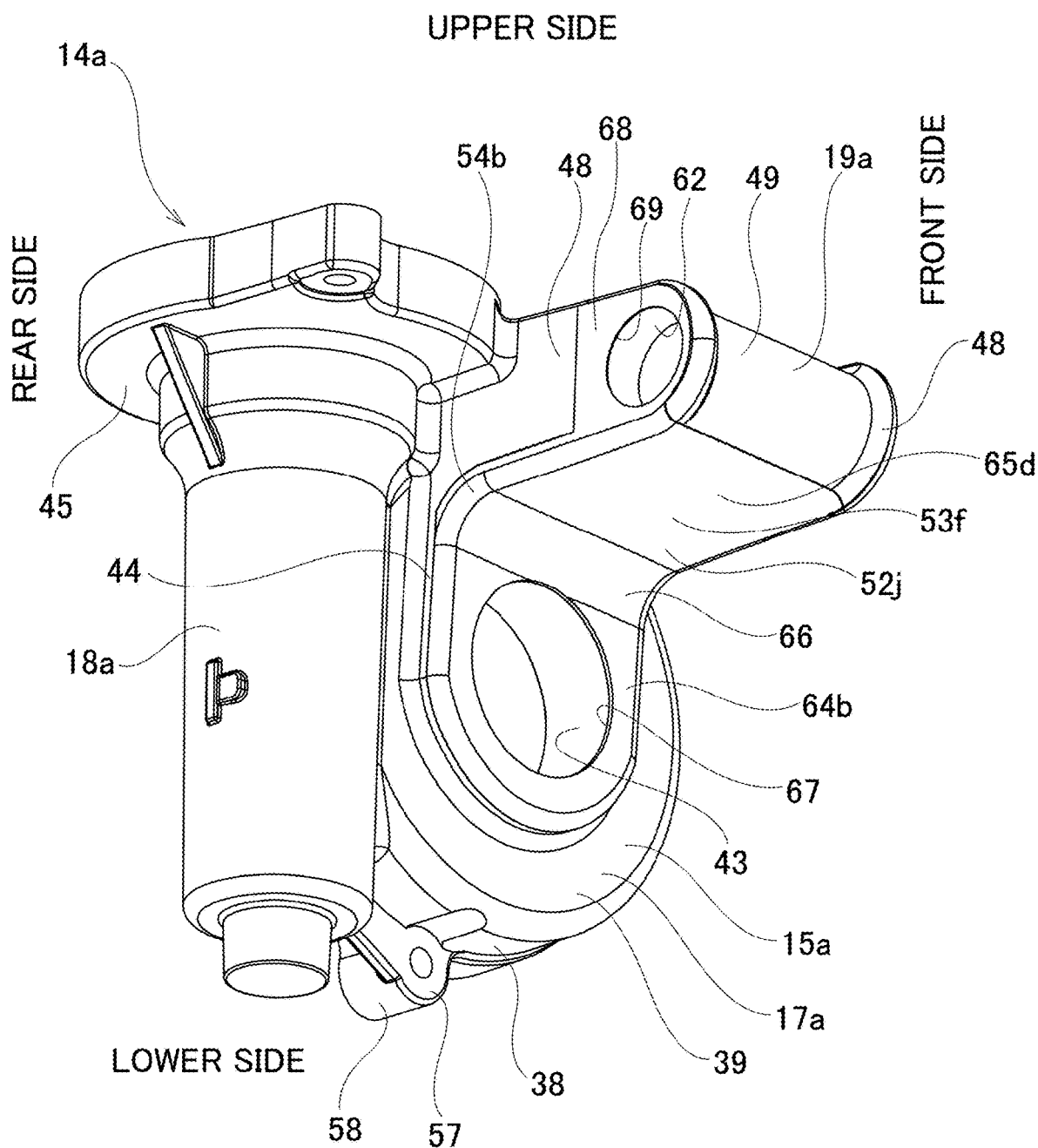
FIG. 32 is a view corresponding to FIG. 5 and illustrates of a gear housing of an eleventh example of the embodiment.
Figure 33:
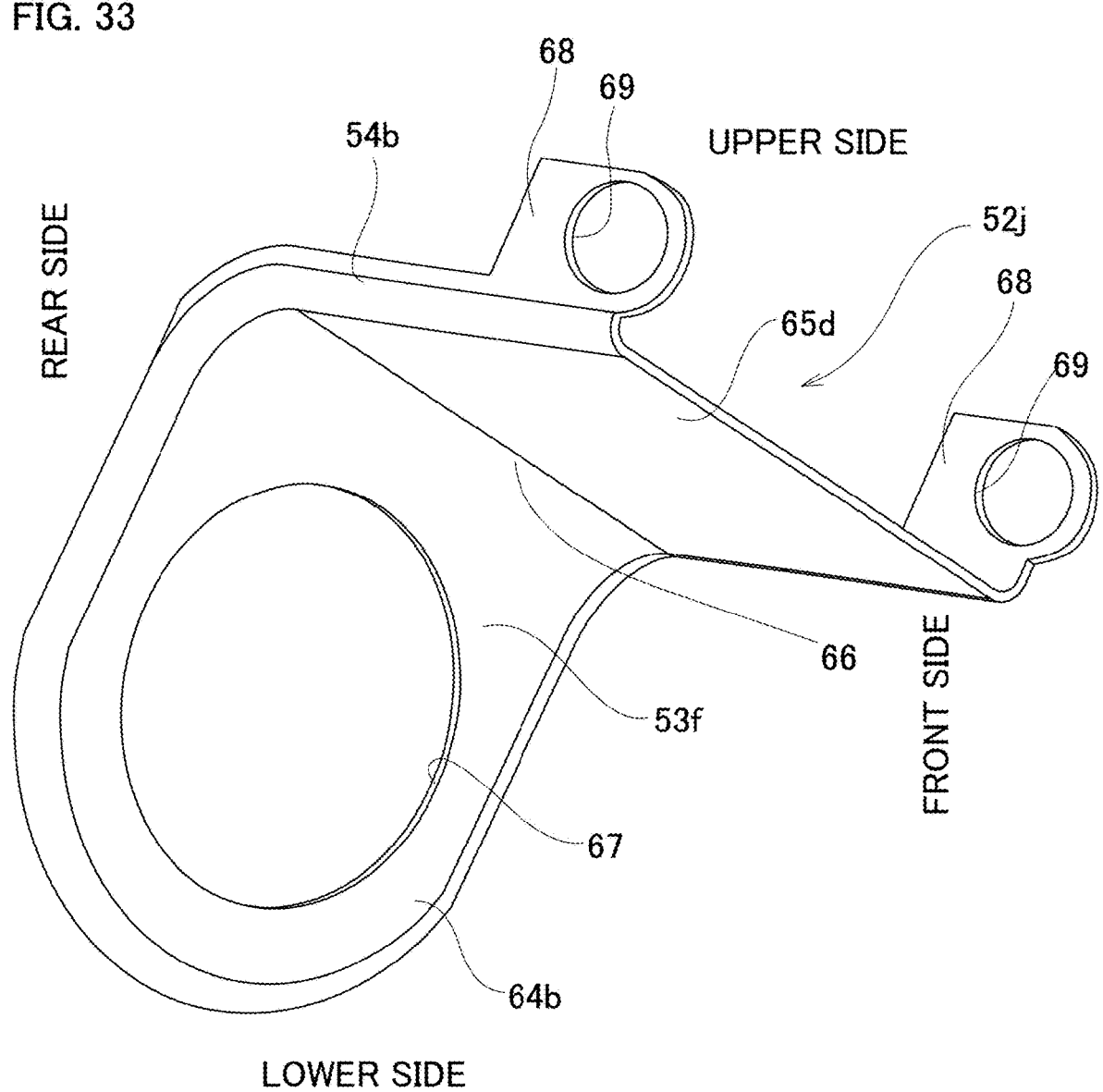
FIG. 33 is a view corresponding to FIG. 14 and illustrates a reinforcing member of the eleventh example.
Figure 34:
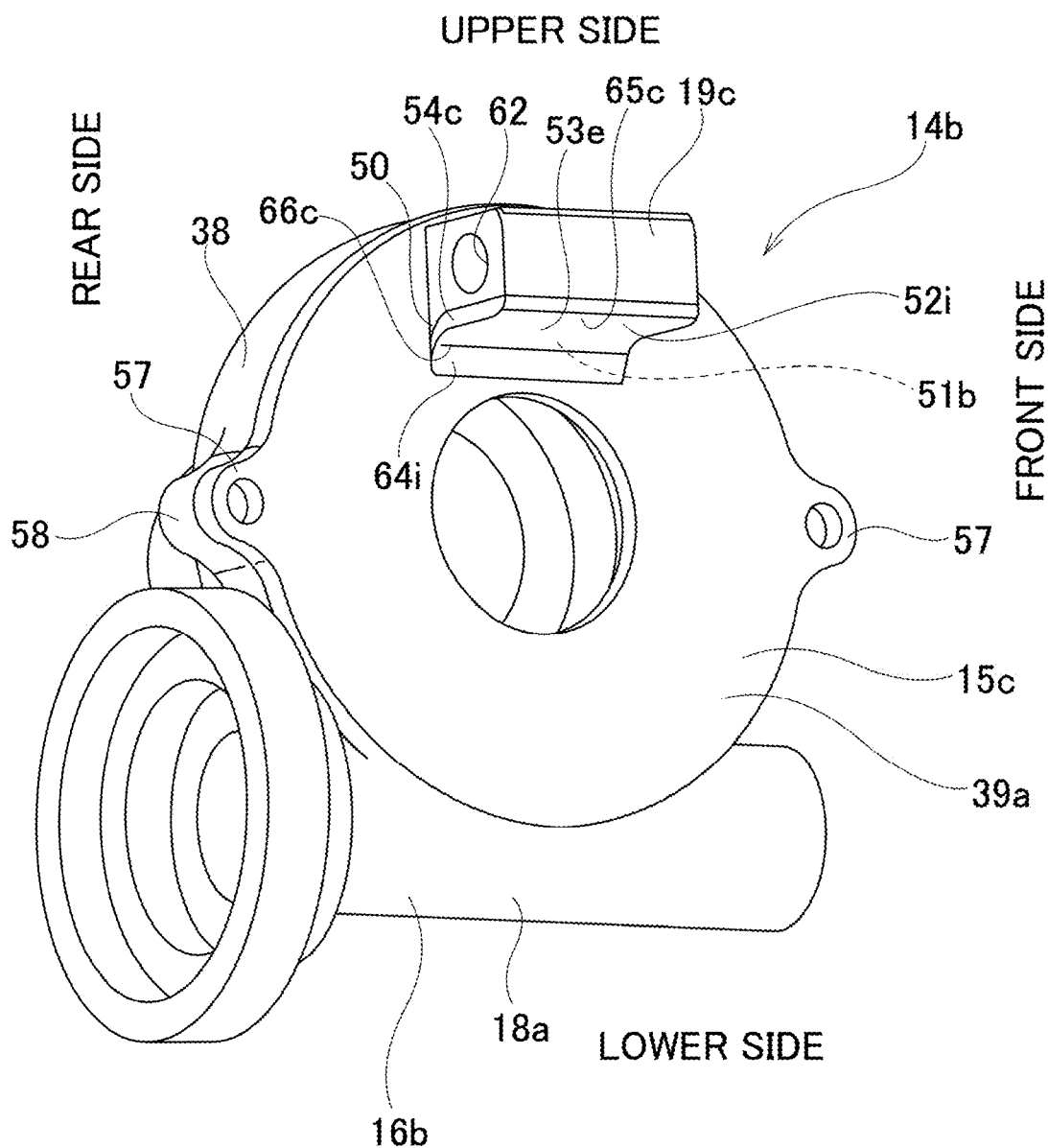
FIG. 34 is a view corresponding to FIG. 5 and illustrates a gear housing of a twelfth example of the embodiment.
Figure 35:
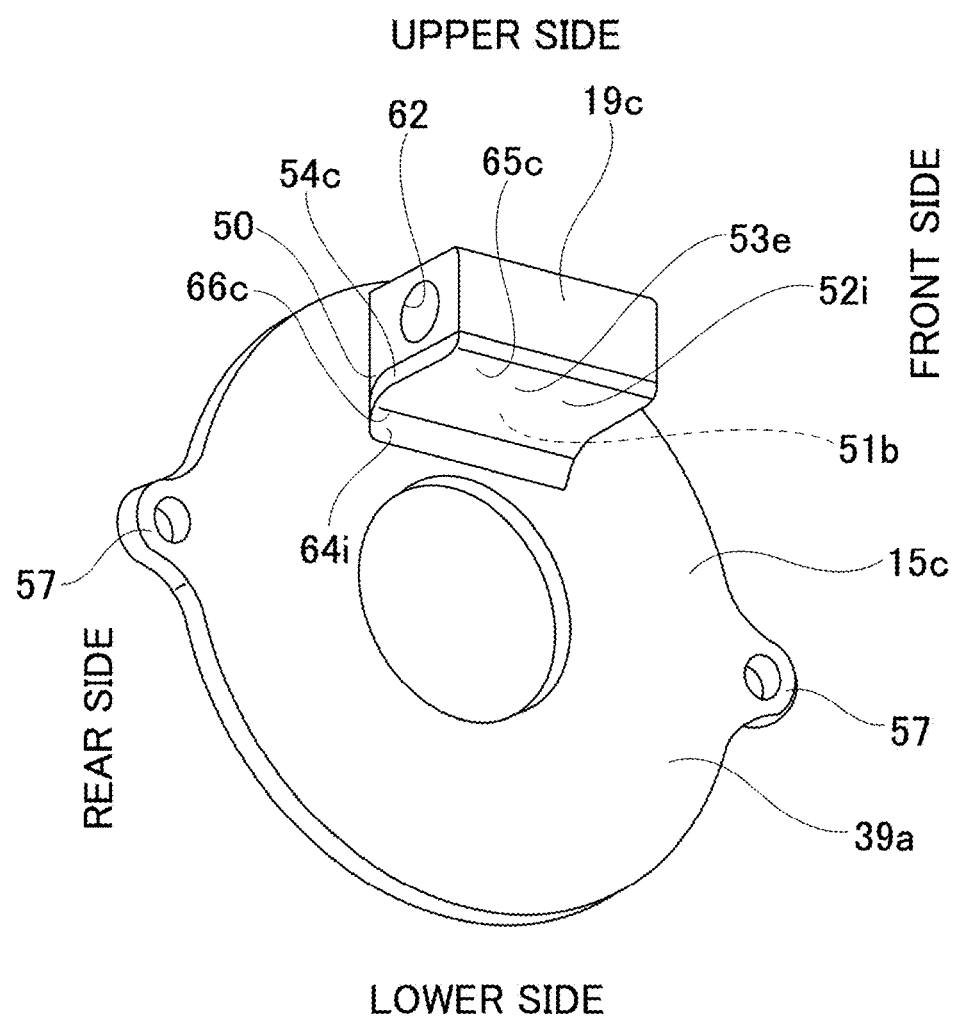
FIG. 35 is a perspective view illustrating a front-side housing removed from the gear housing of the twelfth example.
Figure 36:
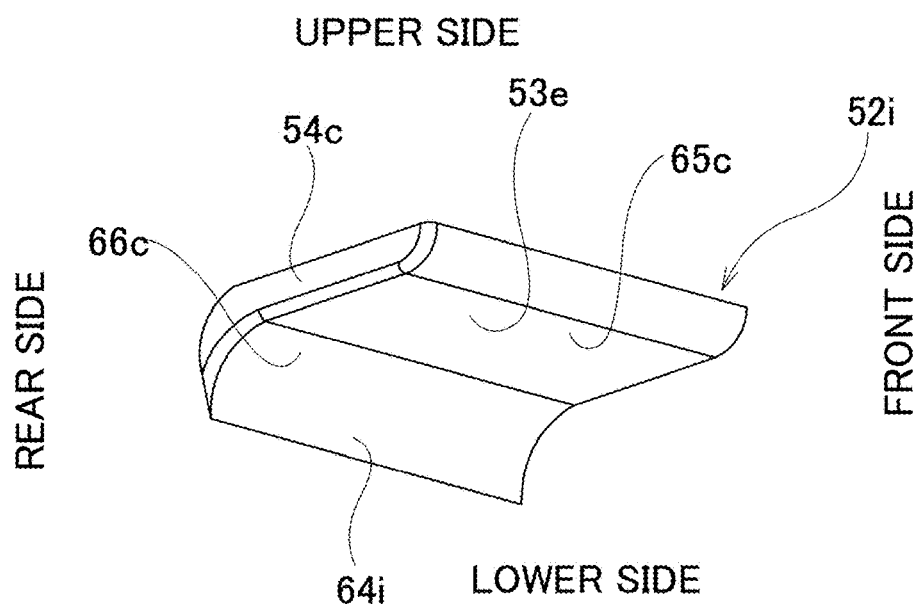
FIG. 36A and FIG. 36B are views corresponding to FIG. 9A and FIG. 9B and illustrate a reinforcing member of the twelfth example.
Figure 36:
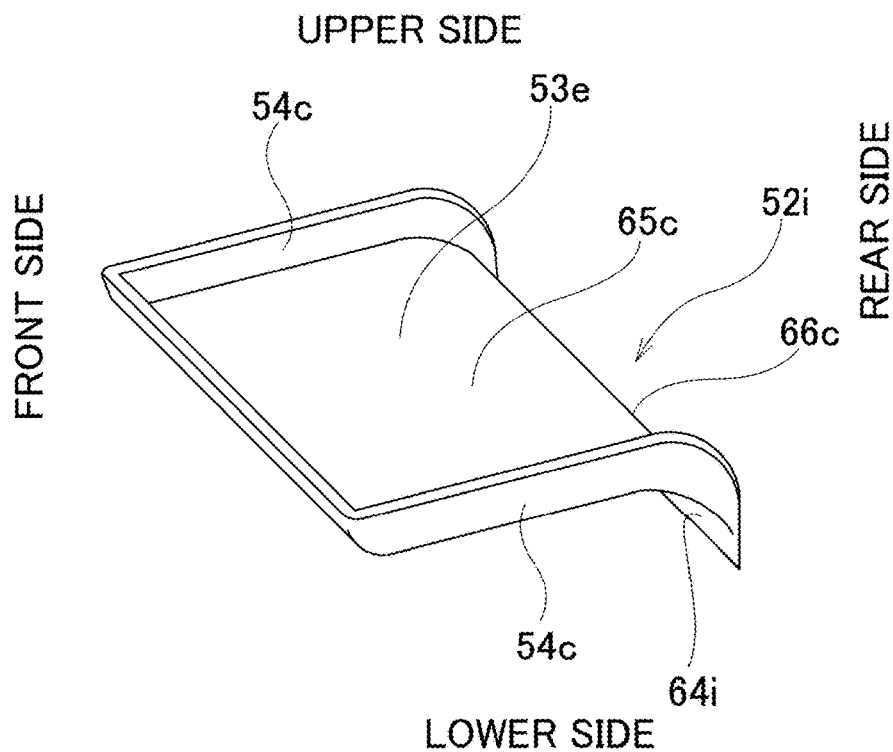

The eleventh example of an embodiment of the present invention will be described with reference to FIG. 32 and FIG. 33.

The reinforcing member 52j used in this example has a configuration in which the support portion reinforcing portion 65d is extended forward more than in the structure of the fourth example. In addition, a pair of ear-shaped side portion reinforcing portions 68 extending toward the upper side is provided on both sides in the width direction of the front side portion of the support portion reinforcing portion 65d. The pair of side portion reinforcing portions 68 covers the front-side portions of the side plate portions 48 of the support portion 18a from both sides in the width direction. A through hole 69 having the same inner diameter as the support hole 62 is provided in each of the pair of side portion reinforcing portions 68 at a portion aligned with the support hole 62.

In this example having a configuration such as described above, the length dimension (front-rear dimension) of the support portion reinforcing portion 65d of the main body plate portion 53f is longer than that in the structure of the fourth example, so, of the support portion 19a of the front-side housing 15a, the stress acting on the joining boundary portion that is a portion joined to the tip end portion (front-end portion) of the support portion reinforcing portion 65d can be kept low. Furthermore, in this example, the front-side portion of the pair of side plate portions 48 of the support portion 18a is covered from the both sides in the width direction by the pair of side portion reinforcing portions 68, so the circumference of the support hole 62 can be reinforced effectively.

The other configuration and functional effects are the same as in the first and fourth examples.

Twelfth Example

The twelfth example of an embodiment of the present invention will be described with reference to FIG. 34 to FIG. 36B.

In the gear housing 14b of this example, the configurations of the front-side housing 15c and the rear-side housing 16b are different from the structures in the first to eleventh examples. In other words, in this example, the front-side housing 15c is made to function as a cover that covers the front-end opening of the rear-side housing 16b, and only the housing front plate portion 39a and the support portion 19c are provided. On the other hand, the rear-side housing 16b is provided with a housing cylinder portion 38, a housing rear plate portion 40, and a worm housing portion 18a.

The reinforcing member 52i made of a metal plate is provided in the corner portion 51b that exists between the upper portion of the front surface of the housing front plate portion 39a, and the lower surface of the support portion 19c. The reinforcing member 52i includes: a main body plate portion 53e that is bent at a substantially right angle along the corner portion 51b, and that covers the upper end portion of the front surface of the housing front plate portion 39a and the entire lower surface of the support portion 19c; and a pair of bent portions 54c that bends in the same direction as each other and at substantially right angles from both sides in the width direction of the main body plate portion 53e and covers the lower end portion of the support portion 19c from both sides in the width direction over the entire length. The main body plate portion 53e has: a front plate reinforcing portion 64i that covers the upper end portion of the front surface of the housing front plate portion 39a; a support portion reinforcing portion 65c that covers the entire lower surface of the support portion 19c; and a curved portion 66c connecting the upper end portion of the front plate reinforcing portion 64i and the rear-end portion of support portion reinforcing portion 65c.

Even in the case of this example having a configuration as described above, weight reduction of the gear housing 14b may be achieved, and the strength of the continuous portion 50 between the housing front plate portion 39a and the support portion 19c may be increased. In addition, it is possible to prevent the occurrence of damage in the corner portion 51b.

The other configuration and functional effects are the same as in the first example.

Figure 37:
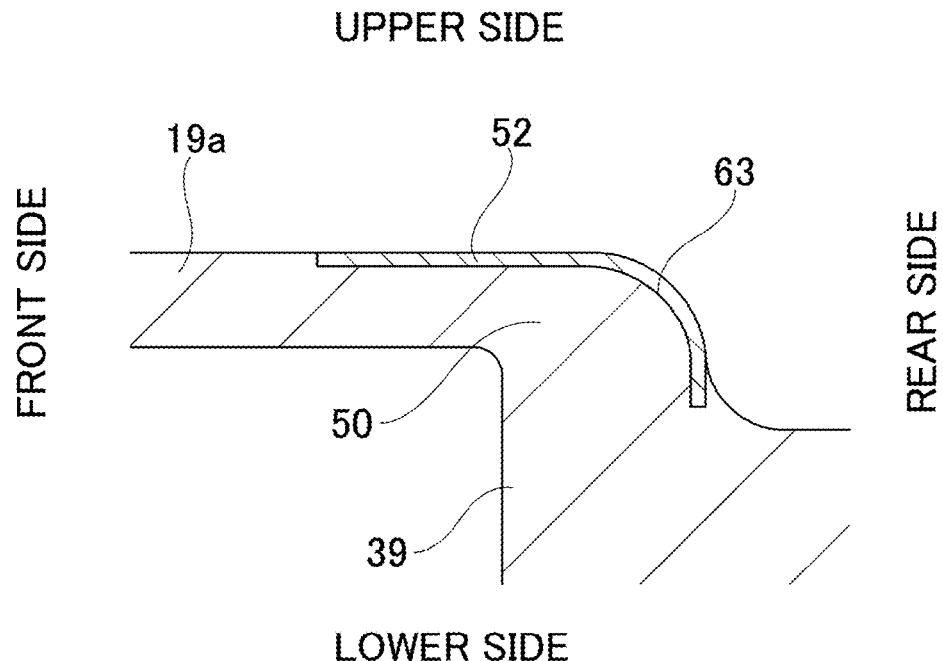
FIGS. 37A and 37B are cross-sectional views corresponding to FIG. 8 for describing two examples of positions where the reinforcing member can be installed.
Figure 37:
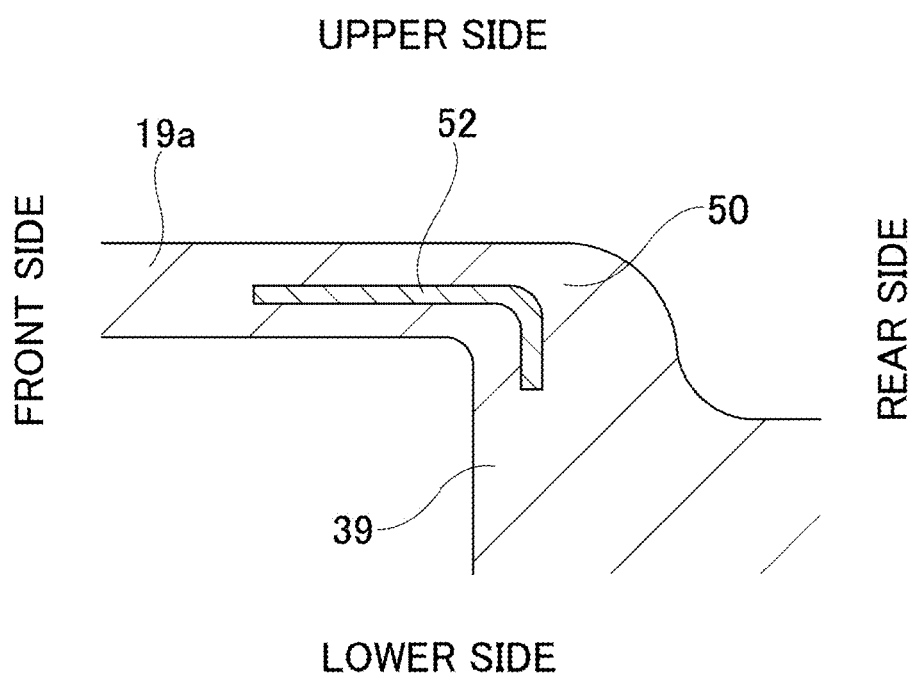

In carrying out the present invention, the position where the reinforcing member is provided is not limited to the corner portion between the front surface of the housing front plate portion and the lower surface of the support portion of the continuous portion of the housing front plate portion and the support portion. For example, as illustrated in FIG. 37A, the reinforcing member 52 may be provided at a corner portion 63 between the rear surface (or front surface) of the housing front plate portion 39 and the upper surface of the support portion 19a, and as illustrated in FIG. 37B, the reinforcing member 52 may be embedded in the continuous portion 50.

In carrying out the present invention, in a case where the reinforcing member is joined to the continuous portion by an anchor effect, the surface of the reinforcing member needs to be roughened, however, the method for roughening is not particularly limited. Examples of the surface roughening method include laser processing, chemical etching, anodizing treatment and the like, however, of these, a method may be appropriately selected according to a combination of the metal material and synthetic resin material. In laser processing, not only may many types of metals be processed, but also sub-millimeter concavo-convex structures may be processed, so when compared with other methods, the resin material may easily enter into the minute uneven portions, making it possible to increase the joining strength. Note that when carrying out the present invention, metal parts other than the reinforcing member may also be joined to the resin parts by the anchor effect. In this case, in a case where the metal part is an annular part, the peripheral surface may be roughened by knurling (flatfish, iris, or the like).

Figure 38:
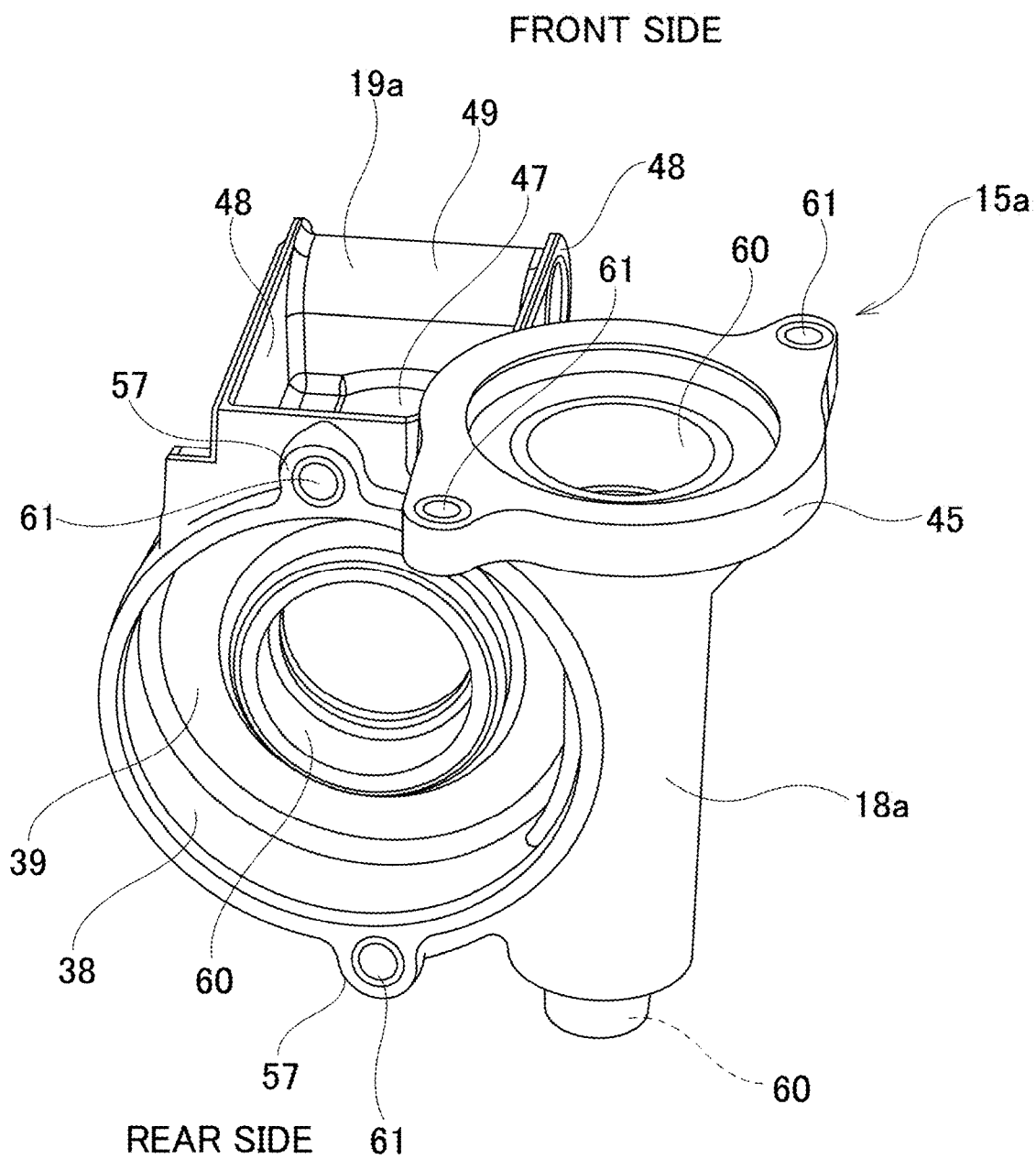
FIG. 38 is a perspective view of a front-side housing as viewed from the rear, for describing a structure, as an example of a structure applicable to the present invention, in which the front-side housing and a metal part are integrated by insert molding.

Moreover, in carrying out the present invention, not only are the front-side housing and the reinforcing member integrated by insert molding, but also other metal parts may be integrated with the front-side housing or other resin parts. For example, as illustrated in FIG. 38, the front-side housing 15a and the metal annular part 60 such as an outer ring of a rolling bearing, a metal sleeve or the like for press fitting an outer ring may be integrated by insert molding. According to such a configuration, it is possible to prevent the occurrence of deformation or deterioration of the front-side housing 15a such as may occur when the metal annular part 60 is press-fitted and fixed to the front-side housing 15a. In addition, a metal bolt fastening part 61 such as a metal nut, a collar (sleeve) or the like may be integrated with the front-side coupling flange 57 and the motor mounting flange 45 by insert molding. For example, in a case where female screw holes are directly formed in the front-side coupling flange 57 and the motor mounting flange 45, there is a possibility that the female screw holes may be deformed and damaged by the axial force at the time of fastening the bolt. In addition, in a case where a through hole is formed in the front-side coupling flange 57 and the motor mounting flange 45 and a nut is screwed onto the tip-end portion of a bolt inserted through the through holes, there is a possibility that the front-side coupling flange 57 and the motor mounting flange 45 will deform due to an axial force, thus the fastening force will be reduced. On the other hand, in a case where the bolt fastening part 61 is integrated by insert molding, such trouble may be prevented.

Furthermore, in carrying out the present invention, it is preferable to use a thin plate of about 1 mm to 2 mm, for example, as the metal reinforcing member. By using such a thin plate-like reinforcing member, the thickness dimension of the resin portion of the front-side housing can be secured to some extent, so that the resin fluidity can be improved when manufacturing the front-side housing by injection molding. Moreover, the weight of the gear housing as a whole may be reduced. Furthermore, in carrying out the present invention, the worm housing portion of the front-side housing is not limited to a structure provided on the side or lower end portion of the output shaft in the width direction of the vehicle body in the assembled state of the electric power steering device. The worm housing portion may be provided at an arbitrary position such as the upper-end portion or the like of the worm wheel housing portion in the assembled state of the electric power steering device. In addition, in carrying out the present invention, the structures of each of the examples of an embodiment of the present invention described above can be implemented in appropriate combinations within a range where no contradiction occurs.

REFERENCE SIGNS LIST

1 Steering wheel
2, 2a Steering shaft
3, 3a Steering column
4, 4a, 4b Electric assist device
5a, 5b Universal joint
6 Intermediate shaft
7 Steering gear unit
8 Pinion shaft
9 Tie rod
10, 10a Torque sensor
11, 11a Electric motor
12, 12a Worm speed reducer
13, 13a Output shaft
14, 14a, 14b Gear housing
15, 15a, 15b, 15c Front-side housing
16, 16a, 16b Rear-side housing
17, 17a Worm wheel housing portion
18, 18a Worm housing portion
19, 19a, 19b, 19c Support portion
20, 20a Worm wheel
21, 21a Worm shaft
22, 22a Worm
23a to 23d Rolling bearing
24 Input shaft
25, 25a Torsion bar
26 Inner shaft
27 Outer shaft
28 Inner column
29 Outer column
30 Lower bracket
31 Tilt shaft
32 Upper bracket
33 Clamped portion
34 Telescopic adjustment hole
35 Support plate portion
36 Tilt adjustment hole
37 Adjustment rod
38 Housing cylinder portion
39, 39a Housing front plate portion
40 Housing rear plate portion
41 Torque sensor housing portion
42 Inner-diameter-side cylindrical portion
43 Bearing holding hole
44 Protruding portion
45 Motor mounting flange
46 Control device
47, 47a Protruding plate portion
48, 48a Side plate portion
49, 49a Support cylinder portion
50 Continuous portion
51, 51a, 51b corner portion
52, 52a to 52j Reinforcing member
53, 53a to 53f Main body plate portion
54, 54a, 54b, 54c Bent portion
55 Bolt
56 Minute uneven portion
57 Front-side coupling flange
58 Rear-side coupling flange
59 Connecting plate portion
60 Metal annular part
61 Bolt fastening part
62 Support hole
63 corner portion
64, 64a to 64i Front plate reinforcing portion
65, 65a to 65d Support portion reinforcing portion
66, 66a, 66b, 66c Curved portion
67 Circular hole
68 Side portion reinforcing portions
69 Through hole

The invention claimed is:

1. A gear housing for an electric power steering device comprising: a worm wheel housing portion, a worm housing portion, and a support portion, the worm wheel housing portion being for housing a worm wheel and having a housing cylinder portion arranged around the worm wheel, an annular shaped housing front plate portion that covers a front-end opening of the housing cylinder portion, and an annular shaped housing rear plate portion that covers a rear-end opening of the housing cylinder portion;

the worm housing portion being for housing a worm shaft, and provided in part in a circumferential direction of an outer-diameter-side portion of the worm wheel housing portion;

the support portion being for providing support with respect to a vehicle body, and provided to protrude forward from a front surface of the housing front plate portion; and at least the housing front plate portion and the support portion integrally formed of synthetic resin, and a metal reinforcing member being provided in a continuous portion between the housing front plate portion and the support portion.

2. The gear housing for an electric power steering device according to claim 1, wherein the reinforcing member is bent shaped and has a front plate reinforcing portion arranged on the housing front plate portion, and a support portion reinforcing portion arranged on the support portion.

3. The gear housing for an electric power steering device according to claim 2, wherein the reinforcing member is bent shaped at a substantially right angle.

4. The gear housing for an electric power steering device according to claim 2, wherein the reinforcing member has a curved portion that is curved in a circular arc shape and connects an upper end portion of the front plate reinforcing portion and a rear-end portion of the support portion reinforcing portion.

5. The gear housing for an electric power steering device according to claim 2, wherein the reinforcing member is made of a metal plate, and is provided at a corner portion of the continuous portion between the front surface of the housing front plate portion and a lower surface of the support portion; the front plate reinforcing portion is provided to cover the front surface of the housing front plate portion; and the support portion reinforcing portion is provided to cover the lower surface of the support portion.

6. The gear housing for an electric power steering device according to claim 5, wherein the reinforcing member has: a main body plate portion that is bent along the corner portion and includes the front plate reinforcing portion and the support portion reinforcing portion; and a pair of bent portions bent in the same direction from both sides in a width direction of the main body plate portion.

7. The gear housing for an electric power steering device according to claim 5, wherein an intersection of an imaginary line passing through the front surface of the front plate reinforcing portion and an imaginary line passing through the lower surface of the support portion reinforcing portion is a reference point, a length dimension from the reference point to a tip-end portion of the support part reinforcement is $L_{insert}$, a length dimension from the reference point to a load application point of the support portion is $L_{load}$, and the ratio of the length dimension $L_{insert}$ to the length dimension $L_{load}$ is greater than 0.29.

8. The gear housing for an electric power steering device according to claim 2, wherein the reinforcing member has a substantially L shape, and one of the front plate reinforcing portion and the support portion reinforcing portion has a length dimension that is greater than a length dimension of the other.

9. The gear housing for an electric power steering device according to claim 1, wherein a minute uneven portion is provided on a surface of the reinforcing member, and the reinforcing member is joined to the continuous portion by an anchor effect caused by a part of synthetic resin of the continuous portion entering into the minute uneven portion.

10. The gear housing for an electric power steering device according to claim 1, wherein the reinforcing member is bonded and fixed to the continuous portion with an adhesive.

11. The gear housing for an electric power steering device according to claim 1, wherein
the gear housing for the electric power steering device is constructed by combining a front-side housing and a rear-side housing in a front-rear direction;
the front-side housing is made of synthetic resin and has the housing cylinder portion, the housing front plate portion, the worm housing portion, and the support portion; and
the rear-side housing has the housing rear plate portion.

12. The gear housing for an electric power steering device according to claim 1, wherein
the gear housing for the electric power steering device is constructed by combining a front-side housing and a rear-side housing in a front-rear direction;
the front-side housing is made of synthetic resin and has the housing front plate portion and the support portion; and
the rear-side housing has the housing cylinder portion, the housing rear plate portion and the worm housing portion.

* * * * *